United States Patent
Roundtree et al.

(10) Patent No.: US 8,840,013 B2
(45) Date of Patent: Sep. 23, 2014

(54) CONSUMER SELF-PROFILING GUI, ANALYSIS AND RAPID INFORMATION PRESENTATION TOOLS

(71) Applicant: Nfluence Media, Inc., Seattle, WA (US)

(72) Inventors: Brian Roundtree, Seattle, WA (US); Thomas S Huseby, Seattle, WA (US); Kevin Allan, Seattle, WA (US); William Munslow, Seattle, WA (US); David Pratt, Seattle, WA (US); David Sakata, Puyallup, WA (US)

(73) Assignee: autoGraph, Inc., Seattle, WA (US)

(*) Notice: Subject to any disclaimer, the term of this patent is extended or adjusted under 35 U.S.C. 154(b) by 0 days.

(21) Appl. No.: 13/707,581

(22) Filed: Dec. 6, 2012

(65) Prior Publication Data

US 2013/0161381 A1    Jun. 27, 2013

Related U.S. Application Data

(60) Provisional application No. 61/567,594, filed on Dec. 6, 2011, provisional application No. 61/597,136, filed on Feb. 9, 2012, provisional application No. 61/603,216, filed on Feb. 24, 2012, provisional application No. 61/724,863, filed on Nov. 9, 2012.

(51) Int. Cl.
  G06F 17/00    (2006.01)
  G06F 3/0482   (2013.01)
  G06F 3/0488   (2013.01)
  G06Q 30/02    (2012.01)

(52) U.S. Cl.
  CPC .......... *G06F 3/0482* (2013.01); *G06F 3/04883* (2013.01); *G06Q 30/0255* (2013.01); *G06Q 30/0207* (2013.01); *G06Q 30/02* (2013.01)
  USPC .......... 235/375; 235/462.01; 235/487

(58) Field of Classification Search
  CPC .......... G06Q 30/02; G06Q 20/3274; G06Q 30/0207; G06Q 20/387; G06Q 30/0208; G06Q 30/0238; G07G 1/0036; G07G 1/0045
  USPC .......... 235/375, 380, 383, 451, 462.01, 235/462.45, 472.01–472.03, 492, 487
  See application file for complete search history.

(56) References Cited

U.S. PATENT DOCUMENTS

| | | |
|---|---|---|
| 5,991,735 A | 11/1999 | Gerace |
| 8,108,245 B1 | 1/2012 | Hosea et al. |

(Continued)

FOREIGN PATENT DOCUMENTS

WO    WO-2010018451 A1    2/2010

OTHER PUBLICATIONS

International Search Report and Written Opinion for PCT/US2012/41178, Applicant: Nfluence Media, Inc., Mailed Aug. 17, 2012, 6 pages.

(Continued)

*Primary Examiner* — Tuyen K Vo
(74) *Attorney, Agent, or Firm* — Perkins Coie LLP

(57) ABSTRACT

An input and processing system allows user input information such as user affinity to efficiently determine user characteristics from content as well as novel input of commands such as copy/paste on a small mobile device screen among other computing devices. A client/server is also made more efficient due to the enhanced gathering of information. Also disclosed is a system for rapid presentation of information such as barcodes at barcode scanners. A system can request multiple barcodes, coupons or the like by detecting a signal from a scanner that information presented has been read.

20 Claims, 16 Drawing Sheets

(56) References Cited

U.S. PATENT DOCUMENTS

| | | |
|---|---|---|
| 2003/0144035 A1* | 7/2003 | Weinblatt et al. ............. 455/566 |
| 2005/0044569 A1 | 2/2005 | Marcus |
| 2006/0010400 A1 | 1/2006 | Dehlin et al. |
| 2007/0244872 A1 | 10/2007 | Hancock |
| 2007/0257792 A1 | 11/2007 | Gold |
| 2008/0035734 A1* | 2/2008 | Challa et al. ............. 235/462.46 |
| 2008/0262908 A1 | 10/2008 | Broady et al. |
| 2008/0270398 A1 | 10/2008 | Landau et al. |
| 2008/0288331 A1 | 11/2008 | Magids et al. |
| 2009/0013268 A1 | 1/2009 | Amit |
| 2009/0089310 A1 | 4/2009 | Lara et al. |
| 2009/0132943 A1 | 5/2009 | Minsky et al. |
| 2009/0271256 A1 | 10/2009 | Toebes et al. |
| 2010/0063872 A1* | 3/2010 | Patel et al. ................... 705/14.1 |
| 2010/0094878 A1 | 4/2010 | Soroca et al. |
| 2010/0169313 A1 | 7/2010 | Kenedy et al. |
| 2010/0262497 A1 | 10/2010 | Karlsson |
| 2010/0293036 A1 | 11/2010 | Meyer et al. |
| 2011/0024490 A1* | 2/2011 | Kangas et al. ................ 235/375 |
| 2011/0055017 A1 | 3/2011 | Solomon et al. |
| 2011/0145039 A1 | 6/2011 | Mccarney et al. |
| 2011/0153429 A1 | 6/2011 | Ullah |
| 2011/0215162 A1* | 9/2011 | Challa et al. .................. 235/494 |
| 2011/0295703 A1 | 12/2011 | Flinn et al. |
| 2011/0319059 A1 | 12/2011 | Padeh |
| 2013/0075464 A1* | 3/2013 | Van Horn et al. ............. 235/375 |
| 2013/0191205 A1* | 7/2013 | Harkless et al. ........... 705/14.39 |
| 2013/0268357 A1* | 10/2013 | Heath ........................ 705/14.53 |
| 2013/0291123 A1* | 10/2013 | Rajkumar et al. .............. 726/28 |
| 2014/0067542 A1* | 3/2014 | Everingham ............... 705/14.64 |
| 2014/0079225 A1* | 3/2014 | Jarske et al. .................... 381/56 |

OTHER PUBLICATIONS

International Search Report and Written Opinion for PCT/US2012/68319, Applicant: Nfluence Media, Inc., Mailed Apr. 5, 2013, 21 pages.

International Search Report and Written Opinion for PCT/US2013/32643, Applicant: Nfluence Media, Inc., Mailed Jun. 7, 2013, 10 pages.

\* cited by examiner

CONSUMER SELF-PROFILING GUI, ANALYSIS AND RAPID INFORMATION PRESENTATION TOOLS

CROSS-REFERENCE TO RELATED APPLICATION(S)

The present application claims the benefit of and priority to the following U.S. Provisional Applications: U.S. Provisional Application No. 61/724,863 filed Nov. 9, 2012; U.S. Provisional Application No. 61/603,216 filed Feb. 24, 2012; U.S. Provisional Application No. 61/597,136 filed Feb. 9, 2012; and U.S. Provisional Application No. 61/567,594 filed Dec. 6, 2011, which are herein incorporated by reference in their entirety.

The following U.S. Provisional Applications are also herein incorporated by reference in their entirety: U.S. Provisional Patent Application No. 61/493,965 filed Jun. 6, 2011; U.S. Provisional Patent Application No. 61/533,049 filed Sep. 9, 2011; U.S. Provisional Patent Application No. 61/506,601 filed Jul. 11, 2011; and U.S. Provisional Patent Application No. 61/683,678 filed Aug. 15, 2012.

In addition, the following applications are incorporated by reference in their entirety: U.S. patent application Ser. No. 13/490,444 filed Jun. 6, 2012; U.S. patent application Ser. No. 13/490,449 filed Jun. 6, 2012; U.S. patent application Ser. No. 13/490,447 filed Jun. 6, 2012; and International Patent Application No. PCT/US12/41178 filed Jun. 6, 2012.

APPENDICES

Figure 1:
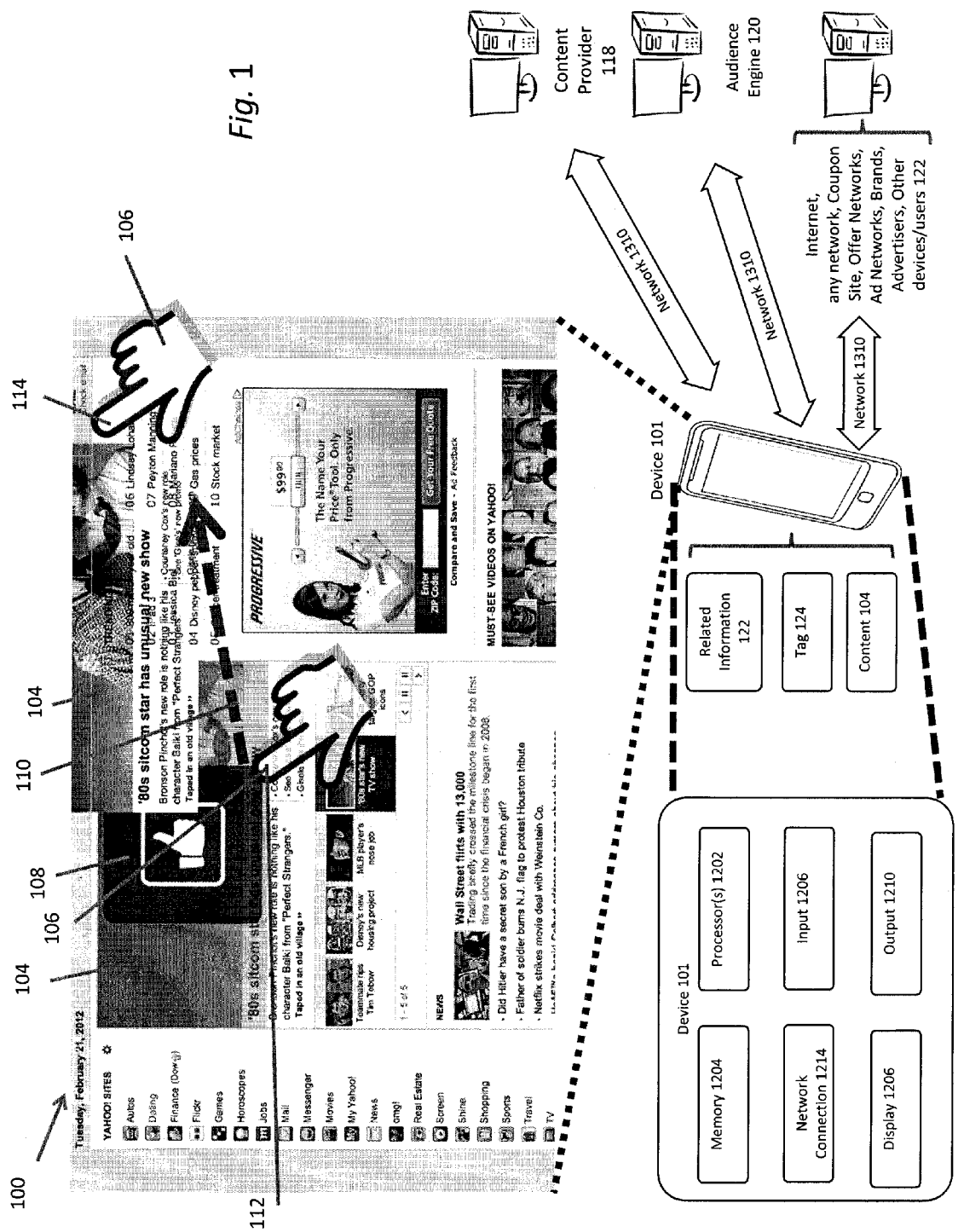
FIGS. 1-4 illustrates an embodiment of the consumer self-profiling tools using angular direction in accordance with an embodiment of the disclosed technology.

Appendix A has a description of technologies described in the incorporated applications.

Appendix B has, exemplary computer code that can be used to implement the Swote™ Tools described.

DETAILED DESCRIPTION

Introduction

There is currently a need for a new type of relevant information that can be provided to users of computer-based devices that is not available by previously existing means. Previously, consumers were satisfied with relevance information from search engines and social media. Search engines use links between web pages to determine relevance and social media uses links between people to determine social relevance.

One new kind of relevant information that is in demand is "right now" relevance (e.g., the answer to the question, "Which pub should I go to near my current location and with the specific group of friends I am with?"). Unlike relevance that is "forever" or "overall" like that found with search engines, this new kind of relevance information needs lots of other information determine, which is often not easily input by the user (especially via mobile devices).

As will be explained in further detail below, one embodiment of the disclosed technology provides a convenient way for a user to enter information that can be used to provide "right now" relevance information. The information is gathered by monitoring how a user reacts to the depiction of a number of items of content such as "ads" and "brands." As used herein a brand can be virtually anything that evokes some sort of positive or negative reaction from the user and which can be correlated to some demographic characteristic. As explained in the incorporated patent applications, a brand may include, but is not limited to, a logo, trademark, animation, text, movies, movie clip, movie still, TV shows, books, musical bands or genres, celebrities, historical or religious figures, geographic locations, colors, patterns, occupations, hobbies or any other thing that can be associated with some demographic information. For instance any thing that can be broadly accepted or recognized by a plurality of users can be a brand. Such examples could be Huggies™ brand diapers, Copper River Salmon™, Microsoft™ software, a picture of Tom Cruise, a picture of a frame from one of Tom Cruise's movies, a musical band name, a musical band album cover, a famous picture such as the picture from Time™ magazine celebrating victory in WWII in which a sailor is kissing a woman, a picture of a house in the country, a picture of a Porsche™ car, a picture of a smiley face, locations (France, Virgin Islands) etc. In addition, brands can be abstract ideas such as "World Peace" and "Save the Whales", political ideologies such as Republican" or other concepts about which a user may have an opinion can also be brands. As used herein, the term "ad" is to be interpreted broadly and can include promotional materials, rebates, consumer notices, content, political or religious materials, coupons, advertisements (including push advertisements), various kinds of recommendations (such as product/service recommendations, content/media recommendations), offers, content (movies/TV shows) and other information that a user may which to receive.

By determining an individual's reaction to one or more brands in an easy and intuitive way, information such as characteristics which include demographic characteristics and interests, can be inferred about the person. For example, people who like Nike™ brand shoes are typically younger individuals who have in interest in fitness. This likely demographic information can be used to offer goods and services to the individual.

In the incorporated patent applications, a user's profile of their likely characteristics is referred to as an "advertar"™, which is has a number of actual or desired demographic and interest tags associated with it as well as associated statistical probabilities. In one embodiment of this technology, Advertars can be presented to merchants who offer the advertar goods or services. However, the owner of the advertar may remain anonymous to the merchants.

Overview of Swote™ Consumer Self-Profiling Tools

To allow a user to provide information about themselves without answering a number of long and tedious questions, a user of the disclosed technology can simply swipe content such as icons on a display screen. Input from swiping content on a display in order to vote on how the user feels about it is referred to herein as "Swote" input (e.g. swipe+vote input). Swote tools discussed below provide: 1) a user a GUI (Graphical User Interface) with the ability to select/input a plurality of commands through an intuitive interface on any device; and 2) a mechanism to allow a user to profile herself by self-curating unprepared content. From the ranking/categorization of like, dislike, numerical, relative ranking of content, or other methods of ranking/grouping content via the user input tools, the user can create/augment an advertar profile regarding her interests/preferences. For example, a user can create/augment an interest graph-based profile via these tools which reflect data about her such as her interests/preferences/demographic data. From this data associated with the user's profile or, advertar, an analysis may be conducted and content which includes items such as brands, ads, offers, coupons, products/services, news, data feeds, pictures or any other data files etc. can be delivered to the user. This matching may be done as discussed in the incorporated applications by using distance/persona vectors.

Swote input may be performed by a gesture which moves an image of content on a display screen through a GUI. Swote GUI tools may focus on the 1) user's angular direction of an initial user point of interaction with the brand/content and the final end point of interaction with the content e.g., the angular direction between the point where the user first touches the brand/content and the point in where the user ends the touch; or 2) the use of command zones in which the user places her finger/cursor or the content.

Swote GUI interaction and analysis may occur for self-curated, unprepared content. The unprepared content includes content, in which previously has not been formatted for processing by taxonomies, analysis for meaning, integration profiles etc. or whose formatting is not known to the entity that will analyze the data. This unprepared content may include information with no or few meaningful related data (e.g., tags). Some examples include: any content that may be displayed to a user such as news stories on a news website, hyperlinks, pictures as well as individual pieces of content such as user selected words, emails in her inbox, URLs, webpages, brands, ads, local files (local or remote) such as Microsoft Word documents through a file browser, music, videos, social media information such as friend profiles, user comments, products (pictures of the product, text, product numbers, SKU codes), users (Facebook, other advertars, celebrities) etc. These can all be, individually or simultaneously, the subject of Swote commands. Various other commands such as copy, paste, send, delete etc. can also be incorporated to be executed separately or with in combination with a Swote input. As such, Swote tools offer collection and the determination tools applicable to any data, which is then formatted for use such as analysis of the data's relevance to the user by those with no prior knowledge of the meaning of the data in the data's original context or the data's meaning to a user.

Tagging/assigning characteristics such as demographic characteristics and interests and assigning statistical probabilities to content that has received Swote input and tags as well as updating the likely characteristics defined by a user's advertar can be accomplished via parsing, semantic processing, natural language processing, context, image analysis (facial/product/geographical recognition), taxonomies, analysis of the information (content) source such as a URL/URI/data links and its demographics and related files, analysis of social/interest graphs/advertar of the user or other users, user personal information, user location, user activities, information from user computing devices, social media trends, marketing data and statistical probabilities as discussed in the incorporated applications as well as combinations of these tools.

In one embodiment of the disclosed technology, a user provides input about a brand by performing a Swote gesture an icon that represents the brand on a screen. The Swote gesture may be detected on a touch sensitive screen or using any other type of input device that can record a user's gesture such as a mouse or air gestures (e.g., Microsoft Kinect™), in response to the presentation of a particular items of content. Content may be presented visually (icons on a display screen) aurally (in music or the spoken word), textually (brand names embedded in other content) or via other means where the user can recognize the content and perform a gesture or otherwise provide a response to the content. In one embodiment, the direction of the gesture is indicative of whether the user likes or dislikes the content. However, how the gesture is performed may, also be interpreted to have a meaning about the content.

Exemplary Swote Tools Embodiment

FIGS. 1-4 illustrate one embodiment of a computing device 101 that is enabled to use Swote input. Device 101 maybe connected by a network 1310 to a content provider 118, (that provide content such as webpage 100), audience engine 120 (that may store profiles) and the internet (that may provide a connection to any network, coupons sites, offer networks, ad networks, brands, advertisers and other devices/users 122. Device 101 is illustrated with memory 1204, wired or wireless network connection 1214, display 1206 (e.g., touch screen), processor(s) 1202, input 1206 and output 1210. Network 1310 may be any network such as a local area network as well as the Internet.

In the example shown, a webpage 100, such as an unprepared webpage from Yahoo.com has a number of content items 104 displayed. The user performs a Swote gesture on one or more of the content items displayed by moving (optionally overriding a previously assigned drag and drop command) an image of the content item either up (to indicate a like) or down (to indicate a dislike). In the embodiment shown, content 104 representing sitcom stars of the 80's receives a Swote up input by user by placing a pointing device such a mouse or finger or air gesture 106 on the image of the content. The user then moves their finger up in the desired direction depending on how the user is performing the Swote gesture. In the example shown, the content is moved in an upward direction as indicated by the arrow 110.

In one embodiment, the webpage 100 or other content is prepared (pre-configured) by the webpage author such as a content provider with Swote input enabling features such as gestures and indicia. In addition, characteristic tags (demographic characteristics and interest tags) and associated statistical probabilities can be assigned to the content, the website can also be configured to determine related tags via a taxonomy as well as display the available commands to a user and indicia to indicate which command was selected. Finally, the website can be configured to assign transmission instructions and associated information such as sending the discussed data above as well as a user's advertar ID to a remote device. In an embodiment discussed below, web browser plug-ins, web browsers, operating systems, and/or applications (including mobile applications) on local or remote devices, may automatically do some or all of these tasks for any unprepared content. Statistical probabilities and weights as discussed below may be either individual or indexed to the population or a combination.

As illustrated, a tag 124 (such as an affinity tag) is assigned by a user gesture to the content 104. The information included in the tag 124 may reference, at least a portion of the content, identity or network address of the content and related information (see below). The tag information is sent to a remote server such as audience engine 120 to determine the meaning of the Swote gesture. As used herein, an affinity tag can be any indication of a user's liking/disliking by such indications as a thumbs up/down, numerical rating, a relationship such as ownership or lack of ownership, would buy again or not would buy again etc.

Content on, the webpage 100 may be prepared for Swote input through the use of user input in the following operations. First, the user directs input such as a mouse hover input or a "touch and hold" input on a display such as a touch screen display on or near content 104 which has a picture and text. In response to the input, it is determined that related information 122 about both the picture and text is available.

Related content information 122 may be located by a variety of ways. In one embodiment, the content on the webpage is related to other content via the webpage ancestry. For instance, a still from a movie next to or otherwise in close proximity to the news story 204 can be related by examining the webpage 100 DOM (Document Object Model) and determining said relation. Information may be also be related if the same or similar tags (e.g., HTML tags) are associated to the information. In another embodiment, related information is information that has been frequently associated together by other users. In yet another embodiment, related information may be information that share the same or similar text/graphics/sounds/authors/domain of origin/topics/categories/titles or have been related by a taxonomy.

In another embodiment, related information can be found by examining links such as hyperlinks. The picture of content 104 links to a URL of the full news story in which further text and pictures are displayed to the user. This data which is linked to content 104 by hyperlinks is related information. In addition, data links from file managers, social media, or any other link can be used as related information. Related information may be also found through following one link to another link. For instance, hyperlinking to the story that content 104 is on and hyperlinking to a second story linked to that, increase a related information lineage.

Here this may be that both the picture and text in content 104 have related information as determined by the URL addresses they are from. (e.g., perhaps both from yahoo.com) The user may select any number of Swote input content items for simultaneous input of Swote gestures. Here, the user desires to select both and does so by clicking on both the text and picture.

In response to verifying that there are data links that reference related information, indicia such as shading the content 104 can be displayed to the user indicating the content is available for Swote input. A menu displaying available commands such as a Swote up input, Swote down input, copy paste etc. can be displayed. Here, the user Swotes up on the content. In response to this gesture, a Swote up tag is assigned to the content. In addition one or more of the identity of the content, at least a portion of the content, a location pointer (network address, global address), tag 124 and any related information maybe analyzed locally or transmitted for remote analysis and integration into the user's profile. In another embodiment, the content does not need to be linked to receive a Swote input, for the content item to be shaded and/or swotable. For instance, a picture without related information may receive a Swote up gesture. In response, in one embodiment a portion of the picture, the identity of the picture and/or a Swote up tag may be analyzed.

From the analysis of the Swote content, various characteristics can be added to a user profile. Here, the content 104 is determined by natural language and image processing to be about an 80's TV show. Content 104 can be associated with the characteristics of an 80's TV fan, and one or more associated statistical probabilities through marketing, other user's interest graphs and taxomonies. For example, if the user inputs a Swote up gesture on the content 104, there is a 90% probability she is an 80's TV fan. In addition, a taxonomy and marketing data for this TV show can be used to supplement the user profile. For instance, in the example shown, the user may be statistically likely to have demographic characteristics of being a male, a certain age X, makes a certain amount of income and is likely has 50% interest in pizza during the late night hours etc. The incorporated patent applications discuss this further. The assignment of tags and probabilities to content may occur remotely or locally.

In another embodiment, a web browser plug-in, application or operating system (e.g., through the file manager) may be instructed to automatically enable content such as pictures, text, icons, ads, coupons and movies in a webpage or other application such as a file browser, media selection window (e.g., movie selection screen on Netflix™ or Roku Box™), contacts/friends window on a mobile device, a mobile device application etc., to receive Swote input (assign commands relevant to providing a reaction to the content) as well as optionally assign tags and probabilities to the content.

In FIG. 1, brand/content item 104 is shown with the user's hand or mouse cursor 106 above it. Here, the user clicks the mouse 106 and selects the content item 104 at starting point 112. This selection of the content can be via various methods such as drag and drop via a mouse, finger, stylus, web cam movement of a body part, voice, air gesture, keyboard etc. Once the content is selected, pre-defined commands can be executed by the user which may include assigning a numerical rating, a relative rating (information relative to other pieces of content or information), a "like", "dislike", "neutral" rating or other rating systems to the content.

As illustrated in FIG. 1, command assignment based on a gesture like movement in an the angular direction from the starting point 112 to an end point 114 at which the user releases the content on the screen from selection 114. In another embodiment, this may be executed without a continuous selection and movement of the content is defined by an initial input point and a final input point.

In this embodiment, two commands are available depending on the angular direction where the user moves the brand/content. If the user moves the brand/content in a substantially up direction as indicated by arrow 110, then a "thumbs up" preference is recorded and if a substantially down angular direction is input, a "thumbs down" preference is recorded.

Here, the user moves the content 104 substantially up within a predefined range associated with a "Swote up" input command while maintaining selection of content 104 in relation to the starting point 112 designated by the user's click or other input on the content. As this occurs, icon 108 is displayed as the command that will be selected. Alternately, and also optional, the original place on the web page that content 104 occupied before being moved can be shown with a different representation of the content 104.

Figure 2:
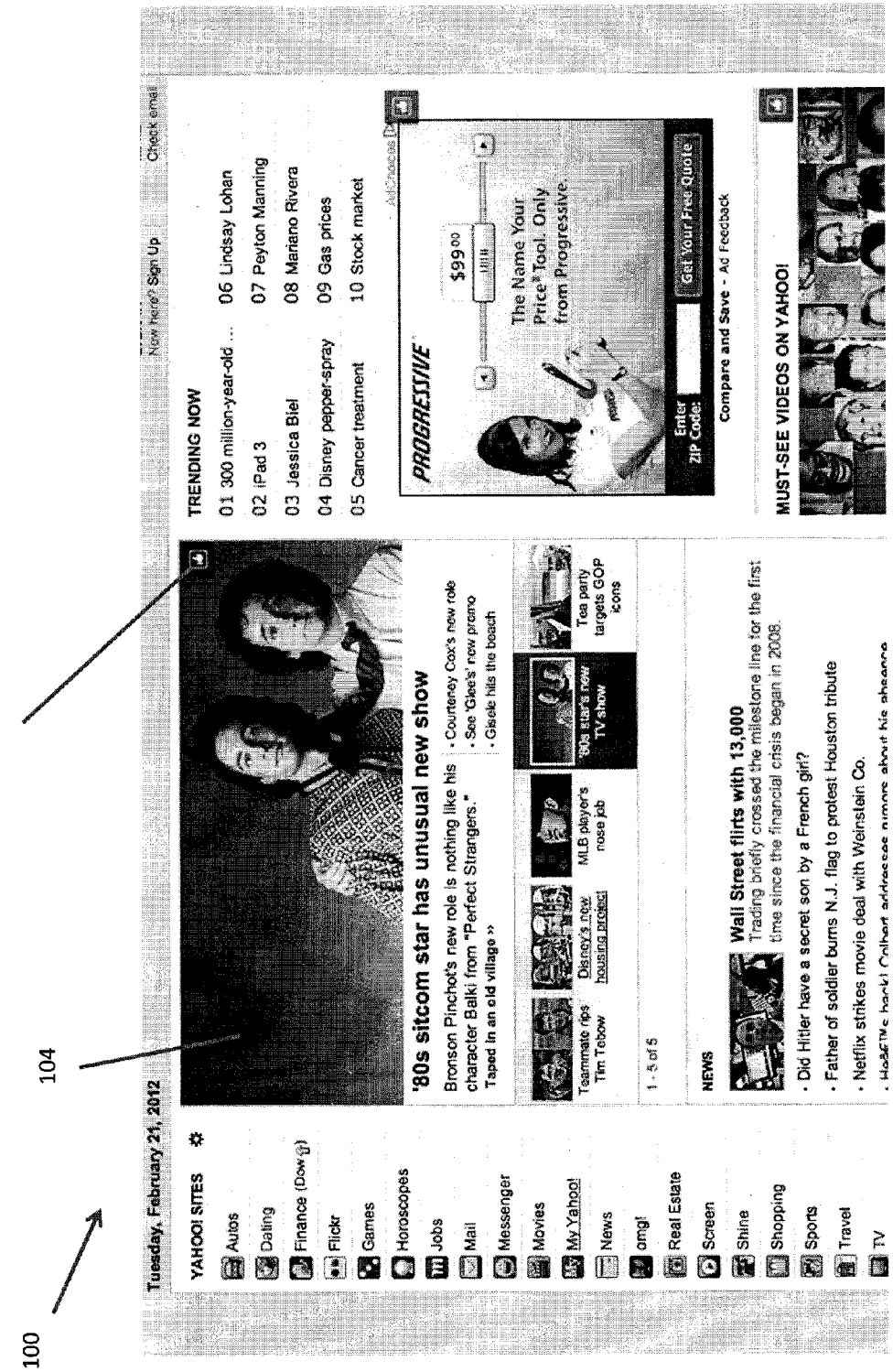

In response to the user deselecting the content item 104, the picture 204 "snaps" back into its original starting point as illustrated in FIG. 2. Icon 108 is shown to the user indicating a thumbs up preference was assigned to content 104. Icon 108 may be shown next to, on top of or in any other position in relation to content 104.

In another embodiment, the content remains static during the user input of angular movement while icon 108 indicating which of a number of commands or inputs will be given or applied to the content as it is being moved by the user, is overlaid or displayed in proximity to the content. In yet another embodiment, as the user drags the content, a menu is displayed that displays a plurality of the available commands (a portion or all simultaneously). In another embodiment, the user may press a key e.g., the SHIFT key to see a menu of commands that are available during input of angular movement. Here a thumbs up and down sign is displayed and the user may drag the content in the direction of one of these signs to execute the command. In one embodiment, in which multiple pieces of selected content with some commands in common and with other commands not, holding the SHIFT key will display only the commands in common to the user.

Appendix B includes reprehensive source code executable by a processor to implement a Swote input selection on an item of content. As discussed above, any content is available for selection by the user. In one embodiment, as illustrated in Appendix B, the position of the user's cursor may select the content, such as the nearest image or anchor tag that is near/under the cursor's current position on a display. In a similar manner, the operations in Appendix B that determine the content selected can also be used to determine the related information.

Figure 3:
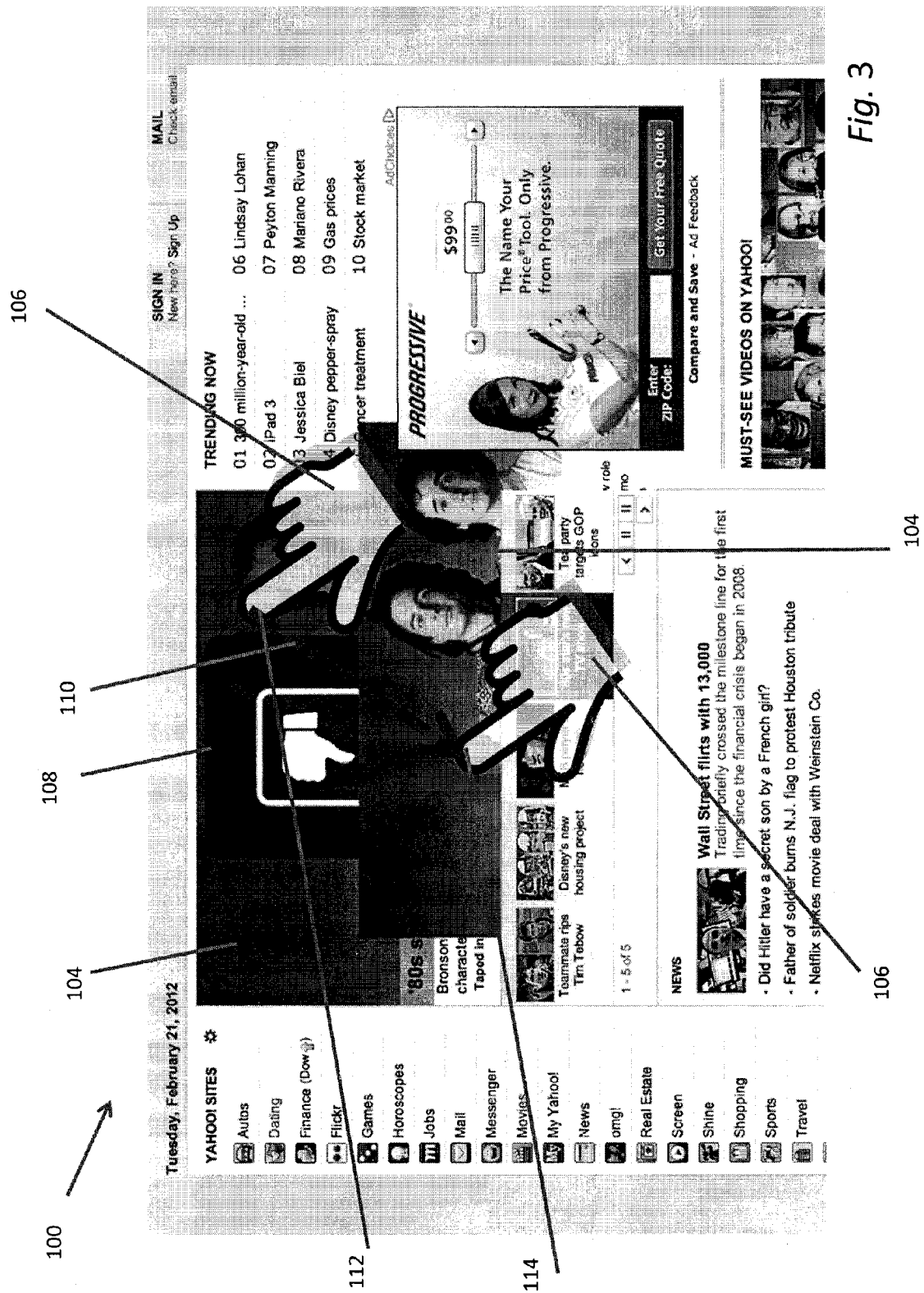
Figure 4:
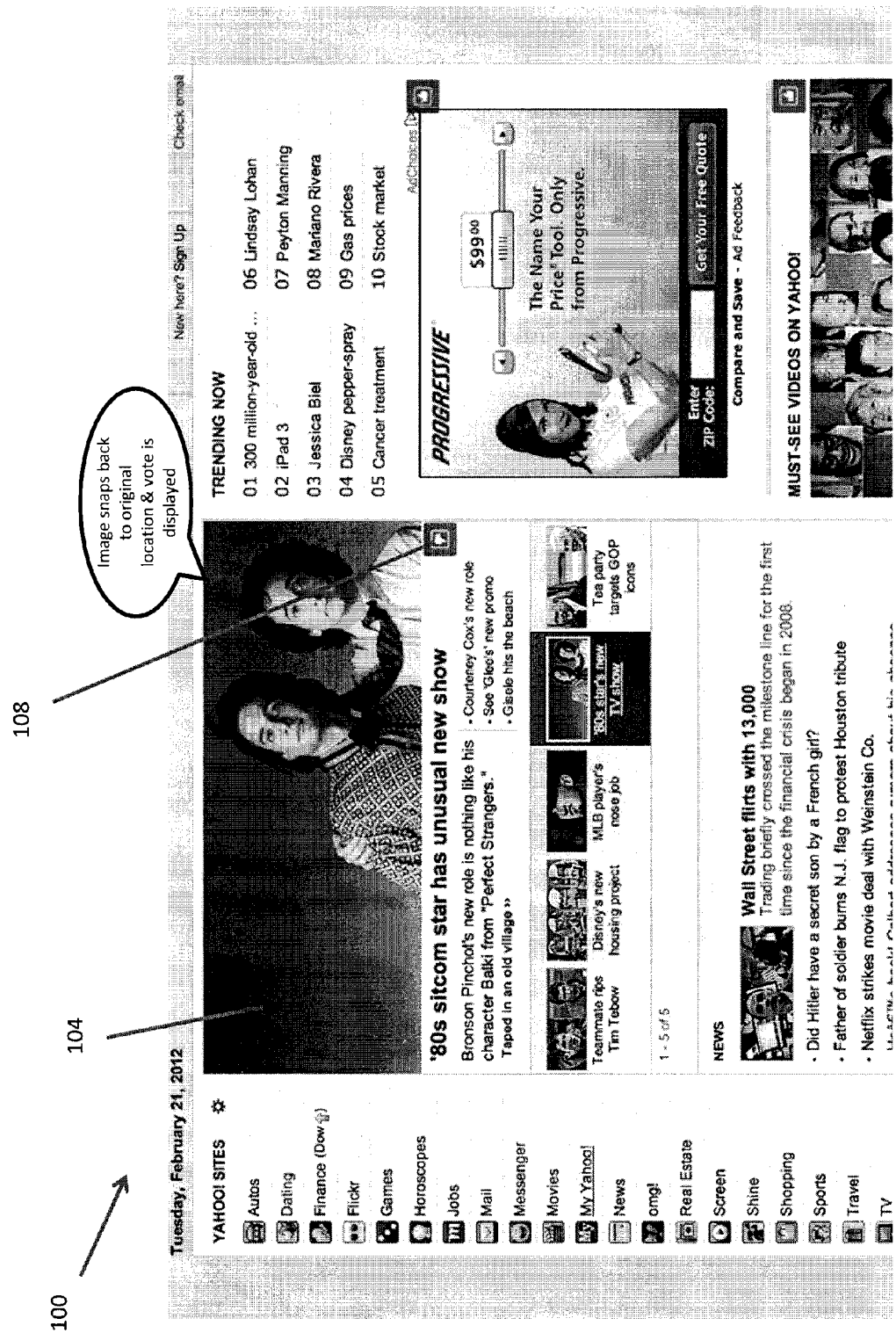

In FIG. 3, the user selects and moves content 104 substantially down in relation to starting point 112 as indicated by arrow 110. The user then deselects the content 104 at point 114, which inputs the command of a thumbs down preference in relation to content 104 based on angular direction of the input from 112 to 114. Additionally, before the user deselects brand/content item (or a representation of the item) 104 as seen in FIG. 4, icon 108 is displayed which displays a thumbs down indicia. In other embodiments, the action to be taken (thumbs up etc.) and the command (the vote was a thumbs up) maybe displayed and or feedback given to the user via vibration, color or through other indications.

Once the user has completed a Swote gesture, a Swote tag 124 such as an affinity tag, the Swote content, as well as any other data that is linked to the content (related information) can be analyzed to determine or update likely demographic information about the user. This may include associated URLs, text, tags, the type of content, the content/category of data/users based that the domain on which the content typically attracts etc. The analysis can be performed locally or remotely and used to create or update a user's profile.

Information that may be useful in gleaning likely demographic information from the Swote operation which may also be analyzed can include contextual Swote information such as the time, data, user/advertar identity, device type, OS type, account information, location of the user when performing the Swote gesture, proximity of businesses, brands, friends and other information to the user, browser history and other commands/tags associated to content 204 such as: metadata, page source code, URL and related URLs, related files, data appearing on the same page or file system and related data such as links to other files, results from collaborative filtering, taxonomy data determined from analysis of the above data such as related categories/interests and marketing data/statistical probabilities related to the data above.

In one embodiment, a user's profile or advertar is created or updated taking into account the information that can be gleaned from the user's Swote input of a particular content item. Information gleaned from the positive or negative Swote input of a content item (e.g., an affinity tag is associated to the content) is incorporated into the user's advertar by, for example, creating new tags with an associated demographic probability/interests and associated probabilities or supplementing existing tags. Various methods can be used to weight or otherwise consider tags in the analysis.

A webpage author may enable the Swote tools via a web browser extension or other tools such as a browser plug-in that manually or automatically parses, determines or interprets the data within the webpage, stream, etc. that is content enabled for interaction with by the user. Also determined may be the type of content, the relevant commands based on the type of content or even relevant to the specific content itself such as adding sports specific commands for content about sports. Software in the form of executable instructions are stored in a non-transitory compute readable memory such as memory 1204, which cause a processor to detect the selection of a brand image or content item and a gesture directed to a reflected brand or items of content according to one or more gesture rules. Once the user completes the Swote gesture on the brand/content item, the software then either computes likely characteristics associated with the Swote command or sends a notification of the Swote command and related information to a remote processing unit that does the analysis.

Swote tools may be used on any computing device and combinations of computing devices connected to each other and executed with a finger, stylus, mouse or other input method. Ads and advertar related information can be input and output to these devices from third party computing devices based on the information entered via the Swote tools and profiles. These Swote tools will operate/interoperate on any device/platform without "uglifying" the information presentation such as by placing unsightly "like" buttons on pictures.

Other Swote Tool Embodiments

In other embodiments, different commands may be input or displayed and then selected for input depending on the angular direction the user selects in relation to the starting point. For instance, the commands could be: copy, paste, vote up, assign metadata tag X of a Swote gesture, vote down, delete, email, SMS, post to social media, right/left/middle mouse input, keyboard input, hover input, stylus input, select, add to profile, add to interest graph, bookmark, save, interact with, move content to X destination (e.g., a certain row in a brand sorting screen), find out more about, help, visualize past selection, set location, taking a picture of displayed content etc. In some embodiments, a numerical or other ranking/voting may be assigned to the content. Different degrees of rank can be assigned by dragging content more or less (voted more in the up direction to like more etc.) distance from starting point 112 as illustrated in FIG. 1. In one embodiment, if a user inputs Swote input on content such as a Swote up input on an ad, a similar ad may appear to replace the first ad. These commands may be executed by a Swote gesture in any combination.

Other commands/combinations are possible such as displaying a numerical slider bar for voting/ranking, assignment to a "read later list", bookmark list, emailing the data or links to the data to herself or friends, execute related searches, open a link to a wiki page, mail the data to a specific contact, post to Facebook, request the data be shown to her later-for instance on a different or same device e.g., the data in the form of an ad shown on her IP TV screen, show related information, show data from a specific source such as data X but from a Google Shopping search, copy to clipboard, etc.

In one embodiment, a Swote input may be used to input commands during the playing of an audio or visual file. A first Swote input may designate that the file is desired/undesired (e.g., via a metatag) but also define the start of a desired time index within the file that the user wishes to define as the subject of the metatag. A second Swote input in the same or different angular direction may indicate the close of the index. Alternately a second Swote input in a given angular direction may further define desired/undesired times within the file. Different combinations of angular directions of Swote input and other commands are contemplated. Some of the defined content may be analyzed for sound, image, text to determine potential features in a video frame the user likes (e.g., an actress, her red dress etc., dialog being spoken, soundtrack) and then this information may be integrated into the user's profile/analyzed/supplemented with a taxonomy etc. This information may be analyzed to determine context and be integrated within an advertar.

In one embodiment, a plurality of commands (e.g., twelve commands) such as Swote input up, copy, paste etc., could be assigned angular positions corresponding to the numbers on an analog watch. At the twelve o'clock position, if the user performed the Swote gesture in that direction, the Swote up input command could be displayed as being selected and upon deselecting the content, the could be activated, at the one o'clock position, the paste command and so on.

In other embodiments, different commands can be input based on the distance the brand/content item 104 is from the original input point 112 by finger or stylus 106. For instance, a first command may be associated with Swote up input at X radial distance from point 212, then adding functionality of opening content 104 at X+1 radial distance and further adding functionality to send brand/content item 104 to "favorites" at X+2 radial distance. Alternately, the functionality may change entirely at X+1 radial distance. Different combinations of the commands disclosed in this application are contemplated. Indicia indicating which commands are selected may be displayed as well.

Swote functionality can be input on any content via a variety of gestures. For example, in response to a double tap gesture on the top portion of an item of content, a Swote up input can be executed and in response to the same gesture in the bottom portion, execute a Swote down command can be executed. Another gesture to input a user's affinity for content is selecting content by placing two fingers on it and pinching and zooming to increase/decrease affinity. In another embodiment, the content may be selected and a substantially circular "swirl" motion can be made in a clockwise/counter clockwise direction to increase/debrease affinity.

In one embodiment, which is particularly useful on a touch screen device, the final input may be the input just before a gesture. For instance, entering the final input like that shown in FIGS. 1-4 may not feel intuitive. In other words, upon selecting the desired command, the user may not feel comfortable merely lifting her finger off of the screen. Here, upon desired command selection, the final input may be the input just before a gesture. Specifically, upon selection, instead of just lifting her finger off the screen, the user makes a swipe gesture up to the upper right and then lifts her finger off the screen. This creates a more affirmative and intuitive input sequence for some users.

Data Collection GUI (Swote Command Zones)

Figure 5:
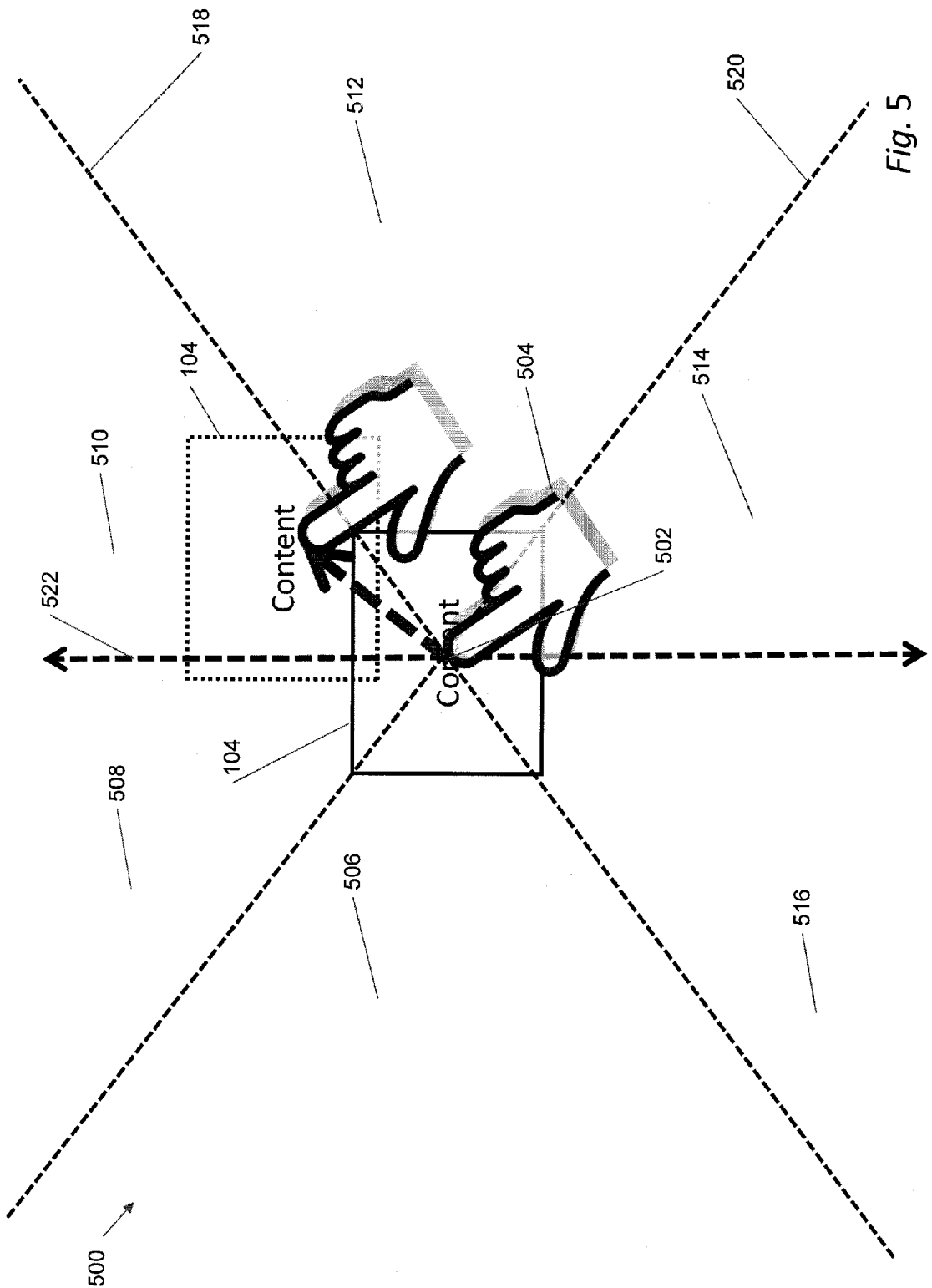
FIG. 5 illustrates an embodiment of the consumer self-profiling tools using command zones in accordance with an embodiment of the disclosed technology.

Along with the above discussed Swote gesture movement in an angular direction, a command zone embodiment is yet another embodiment of using Swote input. FIG. 5 illustrates an embodiment 500 of the parsing of the space around original input point 502 into a template with command zones. Upon receiving initial user input by user 504, various zones can be designated around said point 502 and/or brand/content item 104 by overlaying a template. For instance, content 104 may be associated with four different zones, each with a different functionality. In other embodiments, any point on the display such as the center of the content may be the point around which a command zone template is created/displayed.

The template may be overlaid using initial point 502 on any such content or any other desired point and different content may receive different templates with different commands and/or different command size/shaped zones. For instance, news stories displayed on a mobile application related to a certain politician may be associated a first template and a round picture of a movie frame may be associated a different template each with different commands, zones and sizes to accommodate the different content such as a round template with "pie slice" shaped command zones.

Here, arbitrary command zones 506-516 are created by drawing lines 518-522, through the corners of the content 104. Other methods of creating zones in any shape and number in relation to the content 104, initial input point 502 or, otherwise are contemplated.

The functionality associated in each zone can be selected and/or executed by moving a cursor, finger, stylus etc. and/or brand/content item 104 into each zone. For instance, as brand/content item 104 is substantially moved into zone 506, the zone's functionality is selected. As the user unselects content 104, the functionality of zone 506 is executed. In one embodiment, the functionality of zone 506 is to scroll left in which the brand/content item 104 is scrolled left. Content that is scrolled left/right and does not receive Swote up/down input may be viewed as "neutral" in one embodiment and weighted accordingly when added to the user's advertar. As the user selects the content, indicia of the selected functionality may be displayed and when the user unselects the content, the left scroll is executed and optionally, indicia of the executed command is displayed.

In this embodiment, zone 508's functionality is to input Swote up input which is a command to indicate the user's favorable view of the brand/content zone 510's functionality is to both input Swote up input and open the content (e.g., click on the content), zone 512's functionality is to scroll right. Zone 514's functionality is to input Swote down input which indicates a unfavorable view and additionally it selects the command to indicate that "you" already own or have viewed the brand/content while finally, zone 516's functionality is to input Swote down input.

Figure 14:
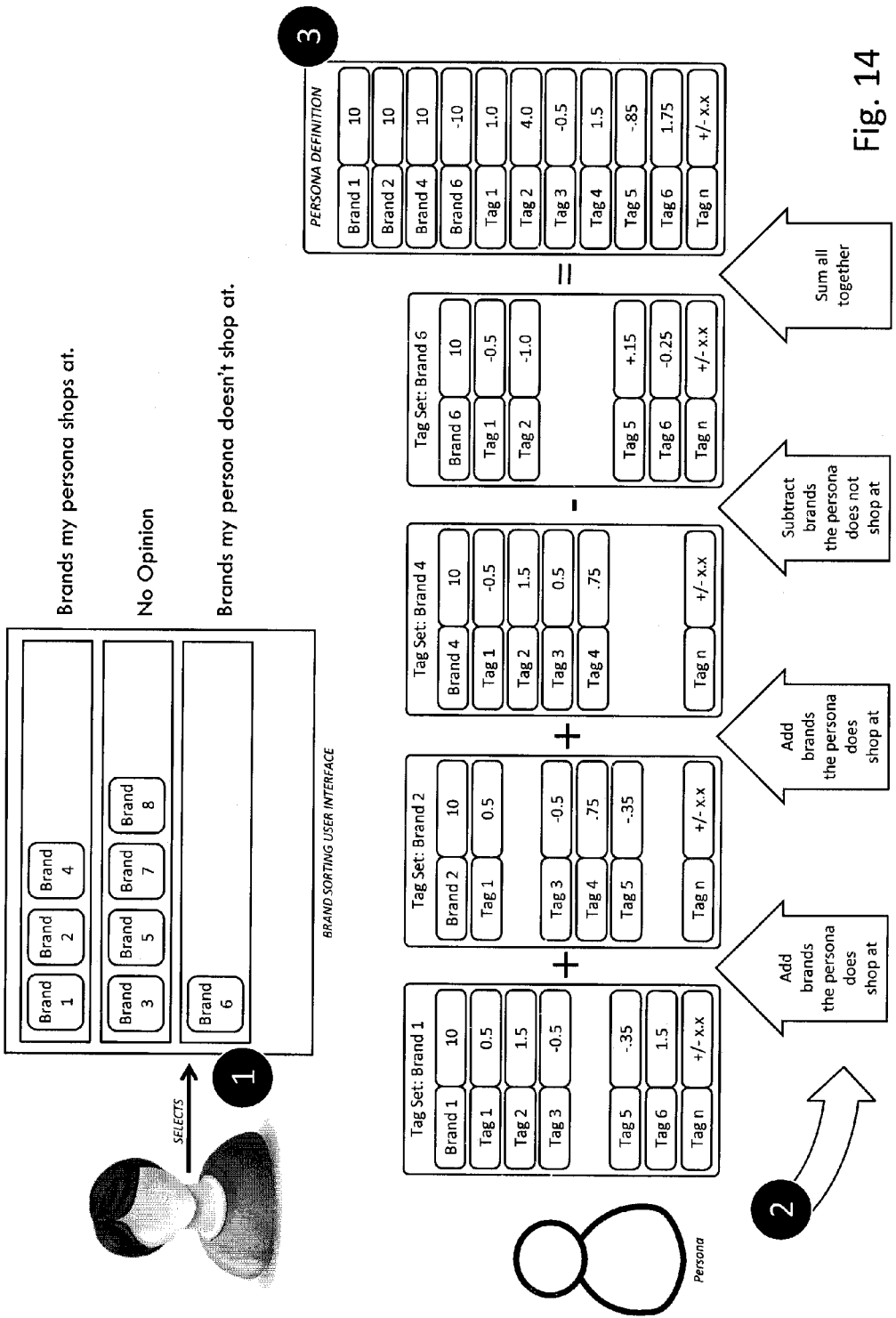
FIGS. 14-16 illustrate briefly the technology discussed in the incorporated patent applications including brand sorting, tying brands to marketing data, a GUI for a brand sorter, an audience engine, serving ads based upon a user's profile, the creation of a user's profile based on brands, and an interest graph among other concepts.

In another embodiment, brands/content are shown like that in operation 1 in FIG. 14. A user may select brand 1 which is illustrated in the top row of the brand sorter, in which Swote command zones may appear. The user may select a command zone which executes a hyperlink which takes the user to the brand's website while simultaneously moving the brand 1 into the middle row of the brand sorter where brands 3, 5 7 and 8 are illustrated. This embodiment may also work with Swote angular direction embodiment.

Various shapes and sizes of command zones are contemplated. These can be customized to the content e.g., diamond shaped content has a diamond shaped template overlay with a plurality of command zones. Each template may have any combination, shape, size and number of command zones.

In one embodiment, a command such as the user pressing the "shift" key may display a menu of the available commands associated with a piece of content. In a touch screen embodiment, touching and holding the content for a substantial period of time may trigger a display menu.

As discussed for the angular direction embodiment, content 104 can be assigned commands unique for that particular content such as type, the data within that particular content (e.g., for a political story, commands to "vote" or for a celebrity dating story commands to "dump" etc.).

Swote Data Analysis

The analysis of content item 104 and related data may be conducted to determine the "meaning" of the brand/content item 204 and/or the meaning of the user's gesture actions (e.g., Swote up input) as well as related information and associated statistical probabilities. "Meaning" may be determined in a variety of ways such as examining the data discussed above as well as probable context of the input, taxonomies, user's history of inputs, browsing history, past profile information etc. The output from this analysis may be new categories of products/services the user is interested in and an associated statistical probability, a new updated probability for a previous category concerning one or more demographic/interest characteristics associated with the user, a new link and associated probability between the user's advertar and another user etc.

The analysis above may be via semantic tools, contextual tools, image/audio analysis tools, taxonomies, brand sorting, associating to marketing data (e.g., statistical probabilities) social media trends and other methods.

Determining the "MEANING" of Swote Data

In one example, Britney Spear's husband appears in a picture that receives a Swote up input by the user. The picture or pointers to the picture are analyzed locally or remotely. Here, characteristics and associated probabilities from the Swote input may be be added to the user's interest graph or Advertar.

On a local or remote computing device, the image and optionally, the associated data such as the URL it came from, other files it is related to by tags, subject matter (other related Brittney pictures), other data it is stored with or related to by data links (other files/web pages it appears on), URLs it is related to; search engine results, other faces or features appearing in the picture (for sound files-other sounds, for video other features in the video, for text files other text or a combination of these) is analyzed as desired.

As above, the content itself may be mined for content. For instance, the content referenced by the pointer is analyzed and the husband's face is recognized by facial recognition technology and identified as her husband Kevin. In response, "Kevin", "Britney Spear's husband", "gossip" tags etc. are associated to that picture via taxonomy or marketing data and associated statistical probabilities previously discussed in the incorporated patent applications. The URL and associated text in the news story and captions where the picture were displayed to the user is also associated to that picture and meaning (characteristics and probabilities about/to the user) can be derived as well such as via sematic or other methods. The Swote input up command can be interpreted as the user liking this picture and weights and tags to this data may reflect this. This data may also be added to the user's advertar. Content recommendations can be made based off the revised advertar as a result of this self-profiling by content curation. For example, the advertar may be offered an ad for a shirt with his face on it.

In one embodiment, a pointer to content item 104 such as a URL where the content is stored is received along with an indication of a "positive" Swote input. This data is also associated with the user's advertar. The URL and content item is analyzed and it is determined the URL is from a website associated to celebrity gossip that is frequented by young females who like the GAP™ brand. A date, time, place, mobile device type, operating system and other data on the user's device is recorded as well. Here, the date was on Valentine's Day at 8 pm on an iPhone from her home. The meaning from this may be that the user is a single female who may be affluent and also likely interested in online dating services. Various probabilities can be assigned given the totality of the gathered data.

Swote data analysis can also consider the context of the input via what commands are input and other factors—such as if the user owns it, would buy it; send to friends, copy, delete it, paste, hate it, your profile (it was determined you are an enthusiast), other voter's, time, place, URL, merchant, color, speed of the Swote input (the user may be likely hesitating during input).

In another embodiment, the user's picture that received a Swote up input of Britney is analyzed and though image recognition technology, her dress is recognized as brand X and the background in the picture is identified as Hawaii (either by image recognition technology, meta tags attached to the picture, information from the webpage (captions) etc.). The "meaning" assigned to the picture may be new or modified statistical probabilities that the user likes Britney, Britney's dress, Britney wearing the dress, Hawaii, Britney wearing the dress in Hawaii, Britney in Hawaii, Hawaii and the dress, Brand X and the dress and various combinations etc. This information may be entered into her advertar.

In another embodiment, a taxonomy is used to contribute to statistical probability characteristics within a profile/interest graph. For instance, if the interest graph had a characteristic of a beach scene X being liked by people who are very "fashionable", the above example may increase the probability that the user is fashionable. In addition, the Brand X dress in Hawaii may be interpreted as the user being interested in tropical fashion which may influence the fashion characteristic such as tropical fashion. In addition, the user's characteristic of "likes to travel" may be increased since the picture was in Hawaii. The user's browser history or past purchases might also be examined to confirm an interest in travel and to which destinations. Other goods/services from brand X and related goods/services, other people who wear the dress, relevant news articles etc. and information related to Hawaii may be recommended to the user and/or influence her profile characteristics in a similar manner.

More granular determinations are possible with more detailed user input. For instance, a picture of Britney Spears with several of her friends is something a user may input a Swote up input on. However in reality, the user may only like Britney Spears and not her friends. The user may highlight or otherwise only select and input a Swote up input Britney Spears and not her friends. This may be accomplished by preprocessing the image with facial recognition technology and allowing each face to receive a Swote input up or down (or with whatever commands are desired) with optional indicia next to each face in the picture to indicate Swote input potential. A "thumbs up" tag is associated to the desired faces and a determination to refine her persona for only Britney Spears and optionally purposely omit positive tags related to her friends. In another embodiment, the plurality of faces may be receive Swote input so that the faces may be ranked relative to each other (most favorite person to least favorite person) and appropriate tags associated in response to each Swote input. In other embodiments, brands such as logos, products and other objects could be recognized. Additionally each type of content may be given different commands such as a person may receive a command of "like her" vs. a product may be given functionality of "already own it". In another embodiment, content may be examined via past user input, marketing data, social/interest graph, profiles and may be assigned commands based upon historical trends. For instance, if Britney was largely "hated" by a large segments of the users, then commands and weights could be assigned like a large probability of hating her or commands or "hate her" or "really hate her" etc.

For instance, in another example, a user inputs a Swote up input brand X. Analysis by a remote or local computing device is done by analyzing similar or related content as optionally determined by a taxonomy/marketing data. Then, demographics related from at least that brand as determined from marketing data, the URL the brand was chosen from (e.g. the brand was originally shown on an EBay or Amazon page) and the URL can be analyzed for information (the URL was for a handbag etc. and related URLs) and associated to the user's profile with associated statistical probabilities. A search can be done for relevant products/services/news/reviews for the brand and recommended to the user based on the profile or optionally only the information above.

In another embodiment, a user goes to a social media page and inputs a Swote up/down on other users, and data on their pages. For example, the user inputs a Swote down gesture on a movie star Facebook profile, but inputs a Swote up gesture on a picture of her and her handbag from a certain movie. The content is analyzed and it is optionally concluded since she Swoted down her Facebook page, but Swoted up the picture, it is determined that the user likes the handbag and/or the movie as opposed to the Facebook profile. Further questions/analysis/data sorting can be done to determine if she likes one or both the handbag and movie.

In yet another example, a user can Swote on a picture objects can then be recognized and data can be associated to it via taxonomy, GPS location where the picture was taken, comments about the picture in social media can create modifications to her profile.

In another embodiment, the user ranking/voting from Swoting can be combined with her friend's Swote input done by the same or similar methods. This can be useful when determining common interests such as via an interest graph. As such, friends or strangers with previously unknown common interests, geography etc. can be recommended ads (e.g., deals which may require multiple people to fulfill or group vacation ads) to people with similar interests determined at least in part by the above methods.

Tag weighting may also consider past consumer actions such as previous Swote input, Swote input of associated users, purchase history from an associated account, browser history, personal data such as demographics, brand Swote input, location history, associated devices, credit card history etc. For instance, people who like red dresses may frequently like red shoes and other red objects. In turn red, objects associated to the user's profile may receive additional tag weighting. This frequency may justify the term red shoes being attached to the user's persona so she may get ads for red shoes.

In one embodiment, tags, and probabilities associated to content may reveal information about the content in relation to other users. For instance a picture rated disliked by a large number of users may reflect information about a user who likes the picture.

In one embodiment, content could be received without a tag. Tagging and weighting could be executed regardless based on historical trends, the user's location, date, time of input etc.

In one embodiment, a brand such as "Subaru"™ is received with a Swote up indication. Marketing data pertaining to the brand could tag and assign weights to the content while considering the Swote up and to other information in an advertar as well as the location, time, date of the user input of Swote up as well as the context the Subaru brand was Swoted up such as a car expert forum or the Consumer Reports™ website.

Multiple Swote Data Feeds and Other Swote Commands

Figure 6:
FIGS. 6-8 illustrate an embodiment of the consumer self-profiling tools using multiple data feeds in accordance with an embodiment of the disclosed technology.
Figure 8:
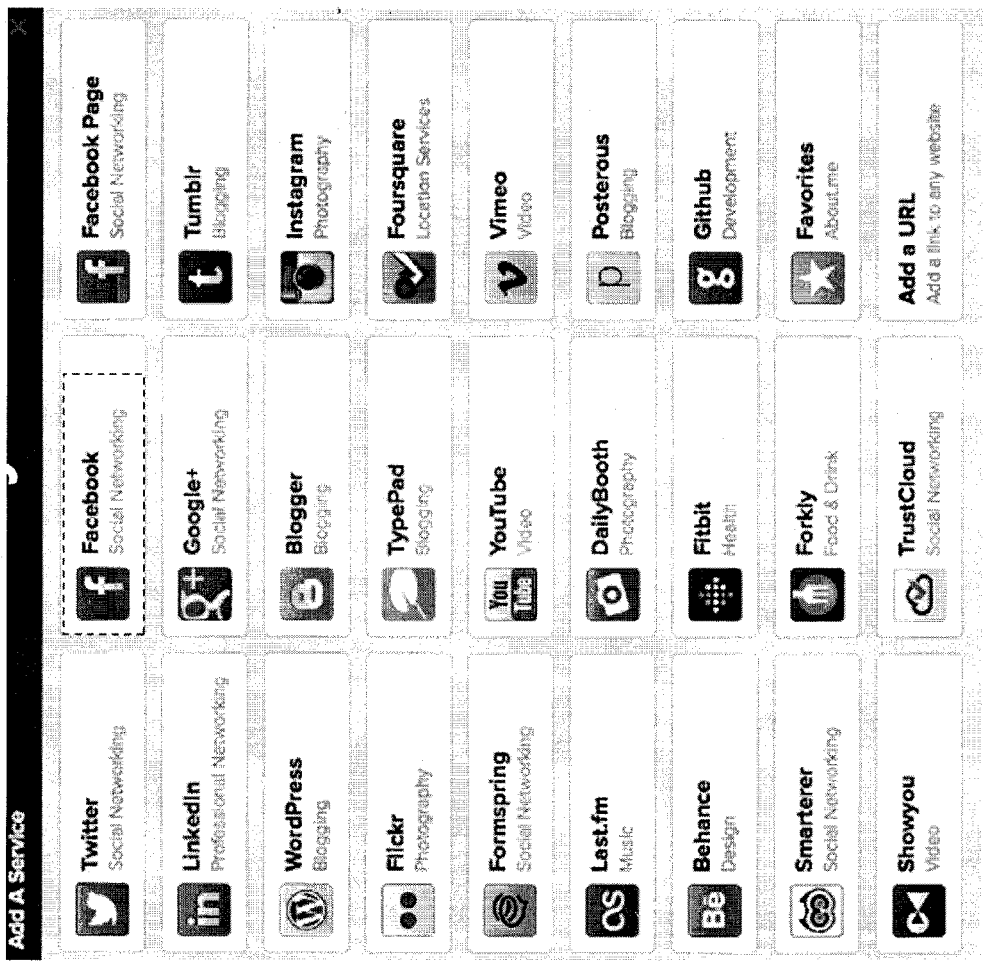

FIG. 6 illustrates another embodiment of Swote input. Here, the content is from multiple data feeds such as Facebook™ in which some example feeds are illustrated in FIG. 8. In addition, local files, email accounts, websites, EPG data and various other content sources such as blogs, news, TV show/movie data may be used.

As illustrated, feeds on a page can be sorted into different interest areas 600 such as work, personal, home, leisure etc. Sorting may be via matching similar tags (as described above) from the content within feeds 602 and 604 to the user profile, image similarity, taxonomy etc.

The user may input Swote input on each piece of content displayed. For instance, content 604 has been Swoted as indicated by indicia 606 as thumbs up. While content 602 is yet to be Swoted by the user. As the user Swotes, in this embodiment, a thumbs up tag is associated with content 604. Tags and other information associated with 604 may be evaluated by previously discussed tools to determine meaning and content scope may be expanded by a taxonomy.

Figure 7:
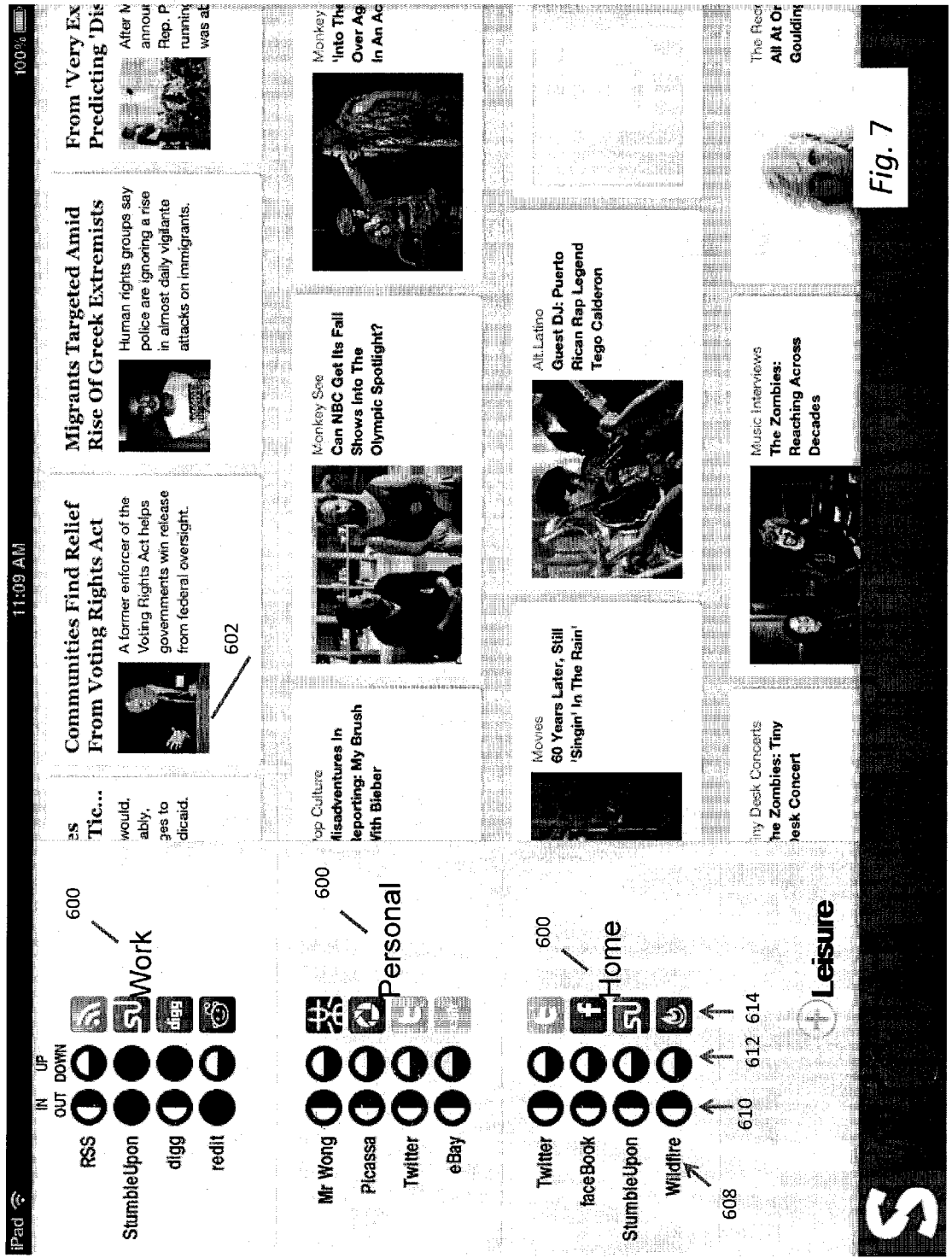

FIG. 7 illustrates operations pertaining to linked accounts that may be executed when content 604 has been Swoted. Icons 608 and 614 illustrate exemplary feed/accounts that the user may be associated with. These accounts, can be the sources of the content 604. For instance, the user may have active accounts that are linked to the operations of the Swote inputs in the embodiment in FIG. 7 on Twitter™, EBay™, etc. The user may select various actions to happen on these linked accounts upon a Swote.

For instance, for a Picasa™ account, if the user inputs a Swote input up as indicated in column 612, the Swote operation may send information to the user's Picasa account as indicated in column 610. In contrast for the user's fig account, if the user inputs Swote input down in her StumpleUpon account, no action is taken for that account.

Augmenting Collaborative Filtering with Swote Input

Figure 9:
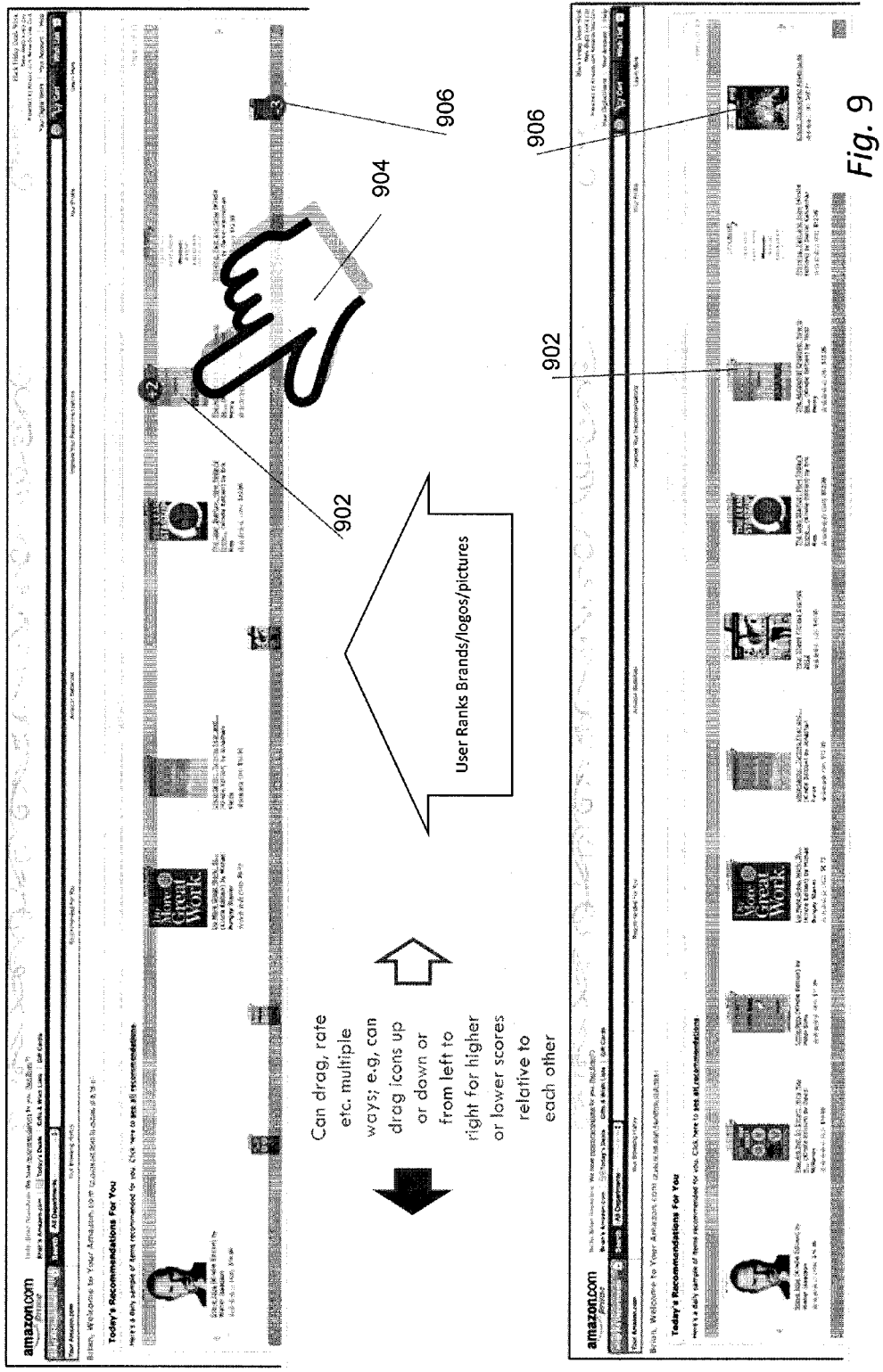
FIG. 9 illustrates an embodiment of the consumer self-profiling tools as applied to collaborative filtering results.

FIG. 9 illustrates two webpages 900 using a Swote gesture on results from collaborative filtering. Here, Swote input enables the user a convenient and intuitive method of entering information to supplement her Amazon™ product recommendations.

In this example, the bottom row of icons are collaborative filtering results displayed to a user based upon previous input such as items browser/purchased etc. However, collaborative filtering as well as other similar techniques, while very popular with recommender systems has some significant shortcomings as opposed to methods discussed in this and the related applications. Specifically, collaborative filtering assumes that large groups act the same, but individuals may not act the same as a group (e.g., atypical purchases of goods such as a small number of users liking sardine ice cream).

Collaborative filtering benefits if a user inputs their preferences which "pushes" or "pulls" the user to or away from datasets associated recommended or less recommended products.

The tools illustrated in the top row, present a solution to these problems by providing a user with a convenient way to quickly and intuitively refine their collaborative filtering results. Here, Swote tools are used to let the user 904 refine the recommendations made with collaborative filtering or other recommendation technologies. In this embodiment, user feedback is gathered to supplement these recommendations by ranking the recommendations via either the above discussed angular direction or command zone Swote embodiments.

Element 902 in the bottom row is illustrated as a recommendation to the user as determined from collaborative filtering. In some existing interfaces, Amazon requires the user to click on the recommendation and asks for a rating 1-5 stars as well as asking if the user already owns it and if she is interested in it at all. Each of these questions is answered separately with associated separate inputs. The commands in FIG. 5 allow a user to answer these questions with a single compound content gesture.

Performing a Swote input for the element 902 solves these problems by letting the user simply move the icon up with her finger or cursor. Granular affinity is illustrated as a +2 rating is given in the top row. Negative granular affinity can be given as illustrated in the bottom and top rows where recommendation 906 is moved by the user into a −3 rating by the user moving the recommendation down. Neutral ratings can be where the user simply leaves the recommendation unchanged.

Various methods of ranking can be done by inputting Swote input on the icons e.g., moving the icon up, down, left, right, speech, gesture input etc. The interface in FIG. 5 may also be used in which the user may Swote in different angular directions in addition to up/down to indicate ownership and interest as well as a positive/negative rating.

The input from the user's various Swote gestures can then be used to supplement the collaborative filtering engines. In order to enable a more customized persona/recommendations/offers when the results from the input of Swote gestures are incorporated into the collaborative filtering engines.

In one embodiment, a Swote input may be enabled without and the results incorporated into the user's profile to enable greater accuracy of collaborative filtering. This process may be repeated as necessary. This may be executed whether the content has been tagged or otherwise associated with information or not. If information was associated, the tagging and statistical probability analysis via Swote input may also consider this information.

In Game Ads

Figure 10:
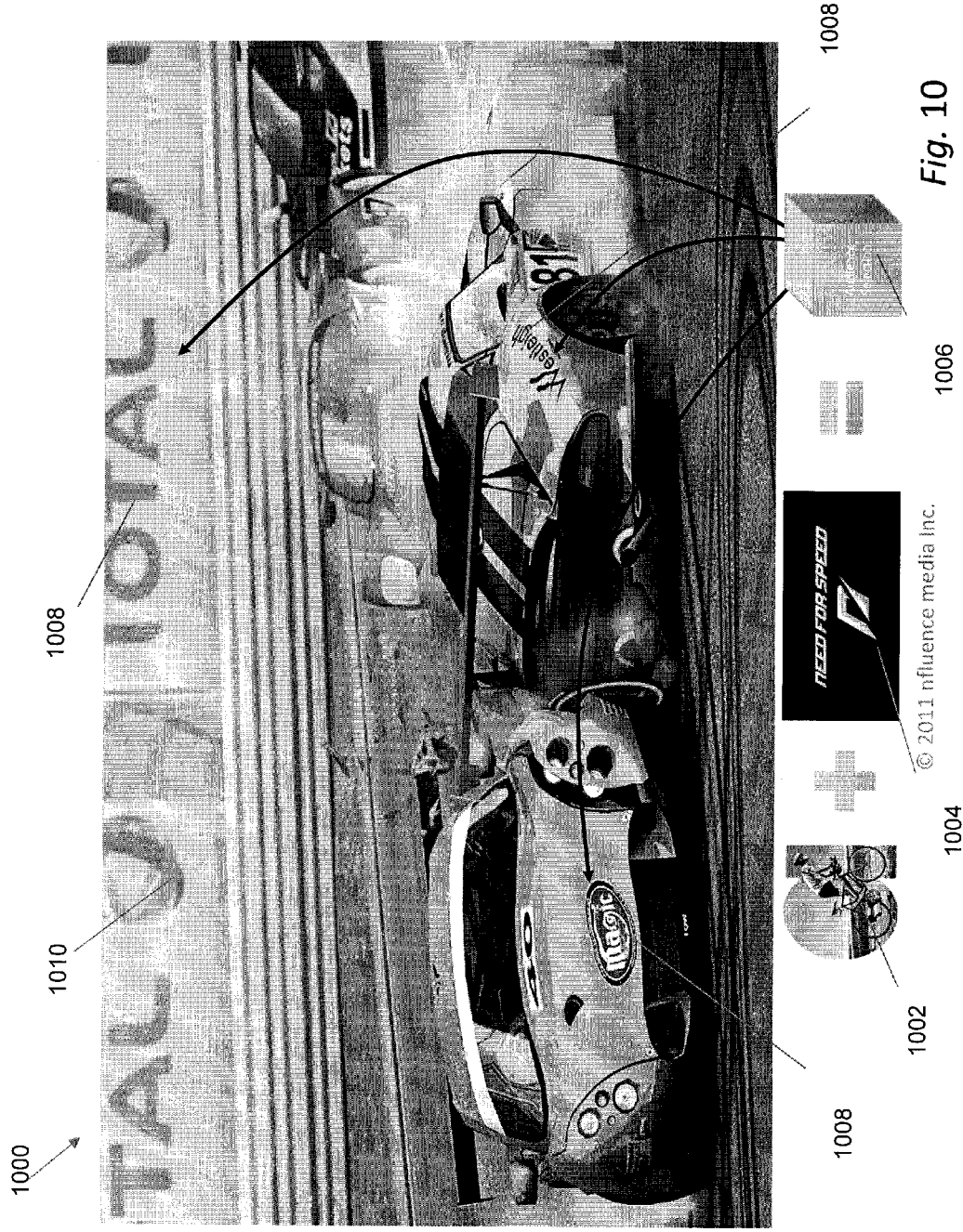
FIG. 10 illustrates an embodiment of persona driven in-game ads.

FIG. 10 illustrates Persona Driven In-Game Ads 1000. Image 1000 illustrates a frame of a video game 1004. As illustrated below the image, a user's advertar (icon represented by the advertar on the bicycle) 1002 is combined with the user's characteristics in and participation in the "need for speed" video game 1004 on a computing device such as audience engine 1006.

In one embodiment, the communicating device may locally or remotely associate the user with an advertar. The computer on which the video game is running is programmed to consider the demographic characteristics of the user as requested by their advertar along with related context (e.g., cars, sports, likely demographic of the players, other connected players etc.), and determine content to display in the game such as ads which may shown on the cars or other places in the game. When the user is playing the game, ads 1008 and 1010 may appear which were determined in the last step. Thus, instead of unsightly pop-up ads, ads in this embodiment appear on locations normally associated with ads such as on race cars, billboards etc. This exposes the user to content such as advertisements with minimal invasion in a more "natural" and less intrusive setting for the ads.

Advertar information collected by various methods including Swote input and the previously discussed brand sorting is sent to the audience engine for processing. This information, new ads etc. can be determined and displayed to the user as illustrated in 1008.

In another embodiment, these tools can be used outside of video games. For instance, on game console, IPTV, media player interface screens, "ticker" bars that scroll information across a screen.

In other embodiments, the user's device is programmed to determine the type of content the user is watching such as a cooking show and display ads related to the particular cooking show and other factors as determined from the demographic characteristics repeatedly by the advertar 1002. The display of the ad could happen in place of traditional commercials, on ticker screens, after the program has ended, or on other devices as discussed in the incorporated patent applications etc.

In some, embodiments, information stored in the user's device such as the game console, the user's game playing style (e.g., typically more aggressive players are younger males), game character customization such as the type of appearance/clothing the user picks for his/her character can be added to the advertar 1002.

Ad placement in a game or other content can be auctioned in real time based on viewership (e.g., number of people, number of people with certain characteristics/advertars etc.).

Dynamic Voting Adjustment Tools

Dynamic tools as disclosed are helpful in preventing a single or small number of "outlying" inputs from unduly changing a profile. In one embodiment, the contribution of potentially "outlying" inputs is minimized through weighting. For instance if the user's profile included the category "spa deals" and the user inputs a single data point of interest for this category (the user is actually not interested in spa deals), the input may contribute a relatively small weighting to that category within the user's profile. Thus, one or a small number of ads may be shown to the user to confirm her interest.

However a relatively large number of inputs will weight the "spa" category in her profile to be more significant and thus show ads to her, induce a taxonomy analysis to find out related areas etc. In another embodiment, a single or small number of positive/negative inputs regarding a "spa deal" in a particular context (such as if the reviewer had been to the spa or the input was received from the spa location e.g., via her smart phone) may cause the single input to be weighted more than a single input.

For instance, it if was determined if the user was at a spa (via her device's GPS), had lots of spa related URLs in her browsing history, had previously purchased spa deals etc., the spa input could be weighted to promote/demote the category more than a single input.

Adjusting a Profile Via Contextual Input

Input into an advertar can occur in a variety of ways in addition to performing a Swote gesture. In one embodiment, a computing device is programmed to analyze and thus add information (via the analysis tools discussed for Swote input) to a profile from pictures a user has taken, sounds recorded, Shazam™ inputs, email, Facebook™ and reviews such as Yelp reviews. For instance, a picture of a flannel shirt is taken by a user at a geolocation recorded by the device. She then sends the picture with an email to a friend using terms like "awesome" and "would match my other brand of flannel pants." Analysis by a computing device can deduce contextual information that she likes the particular shirt, she owns other flannel clothes, or other information can be gathered about her friend from her email address or account information, relevant information of the location (e.g., close to other stores that may give context), as well as objects that can be determined in a picture which may infer that one likes, dislikes the objects given previous information gathered from the user e.g., contextual information in previous pictures, positive reviews (Yelp™ reviews) purchases and so forth. In another example scanning a QR code at a certain physical location can serve as contextual input. For instance, scanning a QR code, input a swote up gesture while at store X, may indicate that you like the particular store, brand, location etc.

Miscellaneous Tools

Feedback Based Ad Bidding System:

Given the ability for a user to enter information such as feedback via the Swote gesture and the Brand Sorter, a bidding system can be implemented to monetize this enhanced consumer information. This may be applicable to advertisers, content sellers/makers and the like.

Previously, search engines ranked displayed search results via: position=bid*relevance or a similar type formula. Given the enhanced consumer information, the following formula may be used to monetize consumer data: position=bid*consumer feedback*Personal Interest Network value. In one example, consumer feedback maybe from the consumer voting/Swote input on a plurality of devices, or a plurality of different consumers: A Personal Internet Network value may be a determined by quantifying preexisting data described in this application, brand sorting and/or a combination in addition to presenting a consumer with checklists etc. For instance, a Personal Interest Network value for a user may be higher if she has a substantially large amount of profile information. The resulting increase of relevance to the consumer results in a correspondently higher charge to the advertiser.

Primer on Interest Graph/Profiles

As discussed in the incorporated patent applications, advertars/profiles of a user may reflect characteristics and associated probabilities among other information. As such, interest graphs may be a part of a profile. As the user inputs information by sorting content and/or performing Swote input (see below), advertars may be created or supplemented with this data.

In one embodiment, an interest graph refers to the specific and varied interests that form one's personal identity, and the attempt to connect people based on those interests. Individually, this may mean different things one person is interested in—be it jogging, celebrity gossip, or animal rights and other interests that make up their likes and dislikes, and what has more meaning to them over another. On a broader scale, it's the way those interests form unspoken relationships with others who share them to create a network of like-minded people.

Figure 15:
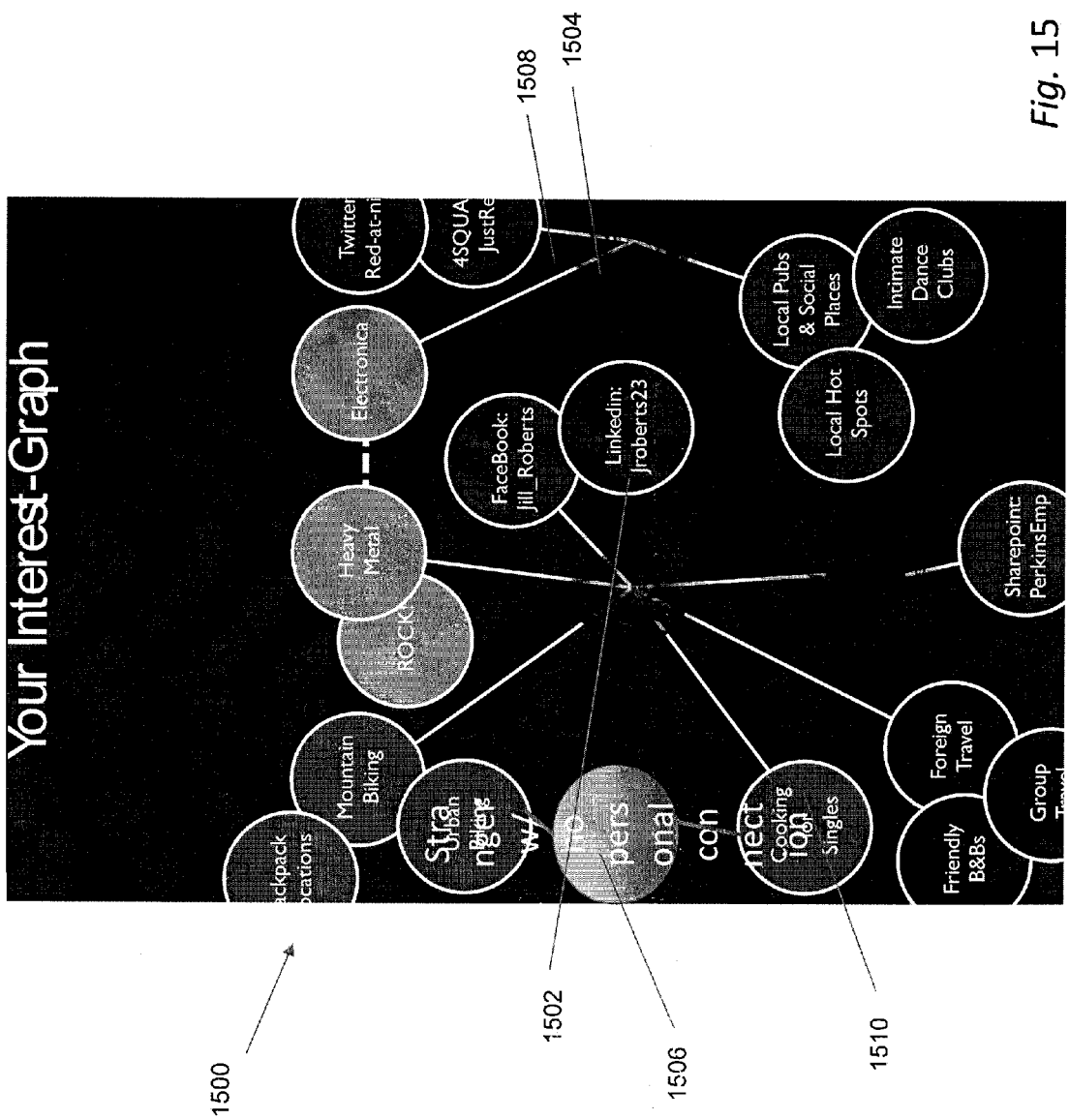

As an example, FIG. 15 illustrates one embodiment 1500 of an interest graph. As illustrated, are a first user's advertar 1502, a second user advertar 1504 and a stranger's advertar 1506 to whom a user has no personal connection to and may not even know. Link 1508 is a statistical probability for a characteristic for an advertar as well as a relationship probability between the interests it connects, while 1510 is a interest in "cooking for singles" in which stranger 1506 and user's advertar 1502 have in common.

As opposed to a social graph (which may also be included or may contribute to an advertar) an interest graph focuses on shared interests regardless of personal connections (such as the "cooking for singles" interest) while a social graph focuses on connections based on personal connections. (In some embodiments, advertars may incorporate social graphs as well or just social graphs alone).

While the social graph consists of a users known to other users, the interest graph consists of what they like, what moves them, and the facets of their personality that, in part, make up who they are and optionally users they may know. These connections can be much stronger, and much more telling, than simply who they are friends or acquaintances with. Two people being linked together because they knew each other in elementary school or work at the same job doesn't necessarily indicate anything about them beyond their connection to each other. And for the people involved, it doesn't always foster a very strong or lasting connection. As such, an interest graph may offer more insight into each person's personal tastes, preferences and behaviors.

Thus, given X users connected in an interest graph who share common interests, are most likely more interested in the same advertising compared to users who do not share these users common interests. In addition, characteristics and associated characteristics (e.g., via a taxonomy) as well as statistical probabilities of those users can be studied and offers, interests, products and other goods/services can be developed specifically for those demographics. This provides a highly personalized experience and also connects a user to users who have characteristics in common who otherwise might never meet each other.

Rapid Information Presentation Tools

Another problem faced by consumers is how to redeem coupons, offers, vouchers, offers, token, deals, discounts, rebates, reward (herein coupons) when purchasing goods. Previously, retailers using scanners and other input devices have discouraged or even forbidden the use of mobile devices (e.g., smart phones used by consumers) for information input such as coupon barcodes and QR codes. This is because it is very time intensive for a consumer to scan a barcode, then "flick" or otherwise display another barcode to the scanner. This often awkward and time consuming process results in long lines as a consumer "fiddles" with the device during this process.

Related to this problem is another problem that has historically plagued information presentation at retailers and other entities namely the need to minimize the implementation cost of new methods of information presentation. To address these problems the disclosed technology provides tools for quickly presenting information without significant or ideally any change to the POS (Point of Sale) equipment such as cash registers, scanners etc.

Disclosed are automated Rapid Information Presentation Tools. These tools provide a method of automatically presenting information to an input device in a fast, automated way, which is convenient and will save time. Specifically, these tools may minimize user interaction during presentation which will prevent user error and time spent "fiddling" with their computing devices.

Figure 11:
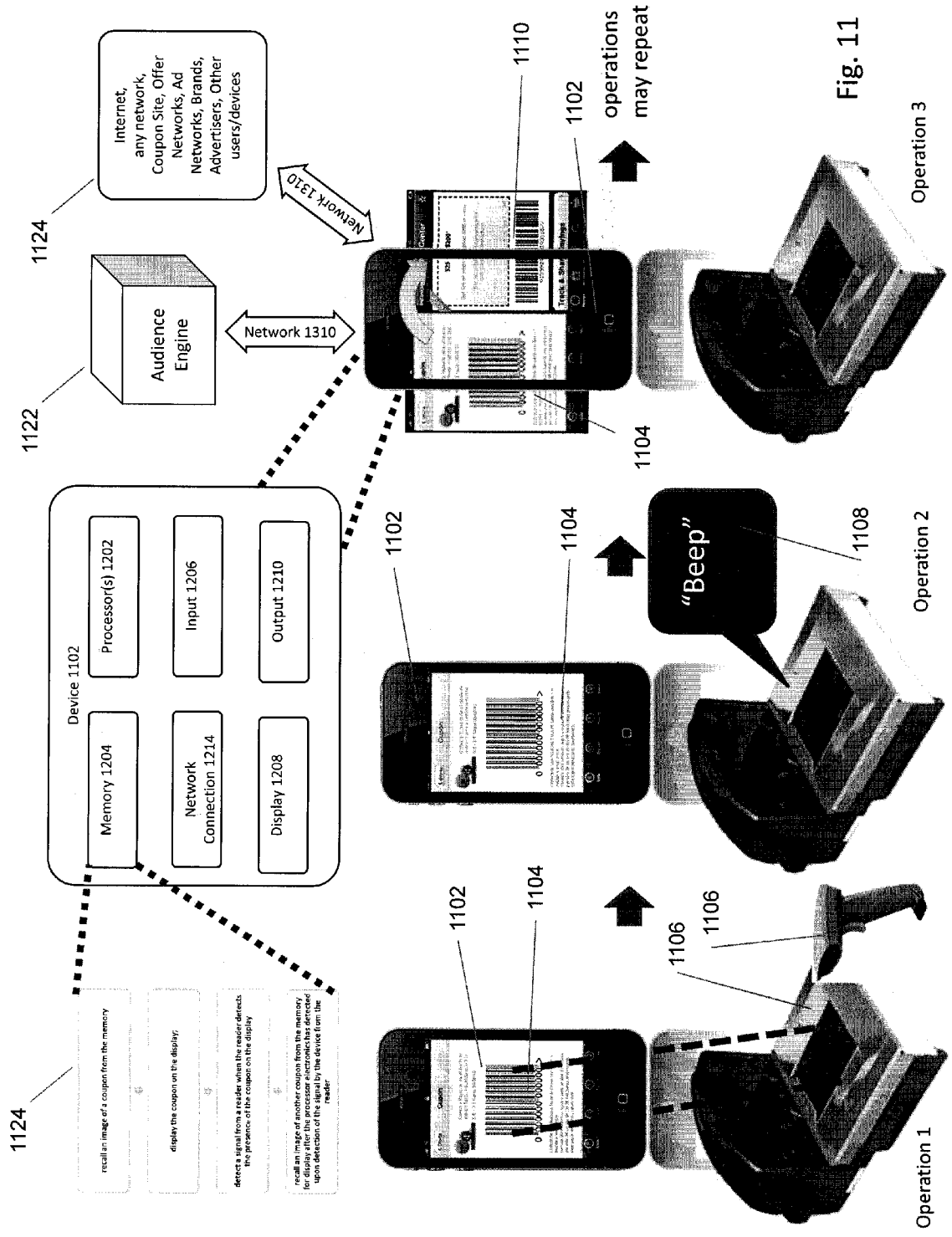
FIG. 11 illustrates an embodiment of a rapid information presentation tool in accordance with an embodiment of the disclosed technology.

FIG. 11 illustrates an embodiment of said tools. In the example illustrated, a consumer's computing device rapidly presents coupons at a point of sale scanner. In operation 1, a computing device 1102, which may be a phone, smart phone, laptop, watch, MP3 player, tablet, netbook, phablet, ultra book, e-reader etc. is presented to an information reader (fixed or handheld) such as scanner 1106 which illustrates both fixed and handheld versions. Here the scanner 1106 is a barcode scanner. The scanner reads coupon information displayed on the computing device that can be in the form of an SKU, barcode, a QR code, a picture of a coupon taken a user, an electronically clipped coupon or any other visual, audio, tactile, vibration, wireless, NFC information etc. in which an appropriate scanner may be used.

The scanner 1106 reads the information from a mobile device 1102 as a coupon 1104 is displayed on the device's screen. In this embodiment, the information reader is an infrared barcode scanner while in other embodiments; the reader can be a QR code reader, an optical camera, or other information input device. The device 1102 can any type of computing device as explain elsewhere such as a iPhone 5™, Samsung GalaxyS3™.

Once the information from the mobile device is received by the reader, then in operation #2, the scanner gives confirmation of input such as an audible "beep" 1108. In one embodiment, the user's device is programmed to give a confirmation indication such as a camera flash, screen indication, beep or vibration upon each successful entry. The output from either the scanner and/or device could be any visual, audio or other output such as a electronic signal, vibration etc.

In operation #3, in response to the mobile device detecting the "beep" 1108 or other confirmation of a successful information input, via a microphone, the mobile device is programmed to then automatically present another piece of information (e.g., another barcode 1110) to the information reader, for quick and automatic input without the user having to do any further action.

This process may repeat for each coupon or item of information to be presented. When all the user's information is presented, then the mobile device can indicate to the user through visual, audio tactile feedback etc. that the information has been presented and received. The mobile device might also signal to the information reader that the process is complete and the information reader is programmed could give a signal to the user that the process is complete. In the same manner, if there was an error scanning (problem with information input or invalid coupon etc.), the mobile device or scanner could indicate to the user of a problem by displaying the problem on the device or the scanner itself could indicate a problem. An embodiment of this process is illustrated in operations 1124 which is stored in memory 1204. Device 1102 may be connected via network 1310 to the internet, any network, coupon site, offer networks, ad, networks, brands, advertiser websites and other users/devices 1124. In addition, it may be connected to audience engine 1122 which may record device 1102 activity such as coupon redemption in an advertar.

Embodiments

In one embodiment, the operations described above occur in a grocery store checkout line. The user presents the device over the scanner with a first barcode on the screen or has the grocery clerk point a handheld scanner toward the user's mobile device. The software on the device is configured to detect a "beep" or other input from the input device when the barcode is read by the input device. Upon successful scanning of a coupon barcode, the scanner beeps which instructs the mobile device (via the microphone) to present another barcode for scanning. Upon completion of the scanning of the desired SKUs, the user may trigger a signal that the process is finished so the user may remove the device from the scanner. Said signal may be a camera flash, vibration, haptic feedback, sound etc.

In one embodiment, the mobile device is programmed to present a new barcode upon a "beep" of only the scanner it is presenting to instead of other nearby scanners emitting beeps near the mobile device but engaging in transactions with other users (scanners in other grocery store check-out lines). This maybe accomplished by presenting a new barcode upon hearing "beeps" of only a certain volume, proximity or other method that limits input only to the relevant scanner.

In one embodiment, the user's device may be placed in a substantially flat position against the scanner surface. In this embodiment, the scanner is integrated into the cashier counter so the surface is substantially parallel to the ground. Upon the device's detection via a sensor such as a gyroscope which verifies that the device is substantially flat against the scanner, and optionally, detection of a scanner signal by the device's camera such as the infrared scanning beam, the device may start displaying barcodes and other information. Optionally, a timer delay which delays presentation until after the device detects it is substantially flat against the scanner to the ground and/or, detects the scanning beam to minimize error.

In another embodiment in which the user does not want or cannot use a substantially flat scanner, the user may start a timer in which she may delay SKU presentation for several seconds to minimize error until the device is presented in front of the scanner. Alternately, upon detection of the signal and optional detection of confirmation of input (beep from the scanner etc.), a new SKU is display and optionally, feedback from the phone such as on the display screen, beep, flash etc. is given to either/or the cashier and user.

In another embodiment, the presentation may begin each time a scanner signal is detected by the camera or when the scanner emits a beep when transmitting a scanner beam. For instance, a hand scanner may transmit a scanning beam that is directed in the general direction of the device's screen. The device is programmed to use the camera to detect the signal and then present a coupon. Upon continuous or reintroduction of a scanning signal, a coupon may be presented. A button or other input mechanism may be used on the device screen for the user to keep the coupon on the screen in the case of a misread. A "rewind" button may also appear so the user may go back and attempt another read of the coupon.

In one embodiment, the first barcode that is displayed is the consumer's loyalty card barcode. In yet another embodiment, when done presenting information, the device will display a neutral screen e.g., black screen or text saying done to prevent the final barcode from being repeatedly scanned.

Assembling the Coupons

There are a variety of tools in which a user may assemble the data for presentation. Said data may include information to be presented at a point of sale such as brands/content/ads including: coupons, SKUs, ads, offers, discounts, vouchers, QR codes, referrals, sales, loyalty accounts (e.g., loyalty barcodes) etc.

In one embodiment, the user may take physical ads/offers/coupons and take pictures of them with her device. The device may either recognize the barcode/QR, image or other information code on the coupon, analyze the image and determine what is in the image and then associate the image to one or more ads/offers/coupons or other information to be presented at the POS.

Once the coupon is recognized, a representation of the coupon may be shown to the consumer such as the picture or other image/text. The user may then categorize the coupon into different stores, categories; discount levels, to be shared with friends, a folder indicating where the coupon was from (e.g., which periodical). Categorization may be via drag and drop mechanism as discussed in previous patent applications such as via tools similar to the previously discussed photo sorter embodiment.

In other embodiment, the coupon itself can indicate which store/manufacture/category it is from/for and where it can be redeemed or stored or where it should remind the consumer it should be redeemed. That may be done by SKU(s), QR code, text (the device can use Optical Character Recognition to read the text and associate the valid store/manufacturers). The device may tag the coupon with any relevant information such as the name of the store offering the discount, expiry date and any other terms or conditions to a picture of a recognized coupon.

In one embodiment, an image of a coupon is enhanced to promote better presentation to the POS, or the SKU or other information is represented in a new, cleaner presentation to mitigate errors during presentation. For instance, a "grainy" picture of a coupon could be associated or be replaced by a newly constructed barcode which would not have any errors introduced by wrinkled paper, a poor camera, bad lighting etc.

In another embodiment, once the coupon is recognized, the device may refer to a remote database to get more information. In one example, the device recognizes a coupon and transmits that information with the user's current GPS coordinates and/or a history of which stores she frequents. The remote server then sends back related products/stores which are in the area or are on routes she has taken with her device.

In another embodiment, the user may gather coupons electronically. In one embodiment, the user may take screen shots of coupons or otherwise "clip" the coupons electronically and use software to recognize the coupons, SKUs, objects within the coupon. The user may store the coupons on an account at a remote server, or a local device.

For instance, the user may have an account or other otherwise create a destination for the coupons. In one embodiment, the user may electronically "clip" a coupon in which the coupon may be associated with other electronic and non-electronic coupons. Once the user has finished clipping such as via a web browser in which she selects which coupons are clipped, the clipped coupons are associated with an account (e.g., loyalty account) and/or sent/electronically printed to a device.

For instance, after a user has electronically clipped coupons on a tablet or other device, the coupons are sent to a smartphone via WIFI or other tools. An application on the phone receives the clipped coupons or otherwise remote and login credentials in which the coupons are stored at.

In one embodiment, the device may be associated with an email, other identifying information, device or software ID or loyalty program account such as a Safeway™ Rewards Card. The clipped coupons are then sent to a mobile device for presentation at the point of sale. In addition, the clipped coupons may be analyzed and appropriate discounts offered or new coupons may be offered based on the clipped coupons. The clipped coupons may be automatically categorized by type, section of the store (e.g. fruits/vegetables), expiration date etc.

Reminders may be sent to the user of expiration dates, as the dates get closer. Reminders may also be based on geolocation to the store, or once in the store, to the specific sections of the store where the goods associated to the clipped coupons are displayed.

A log/history may be associated to a particular account/device. This may be used to determine which coupons were presented successfully and can report the success/failure of a coupon to other users. For instance, certain merchants may not accept a coupon while others will. The specific result may be shared with other users to aid in redemption.

An app on the device may program the device to activate the camera and then all pictures taken through the camera or send them for remote analysis. The images of coupons or images that are related to products, services can be recognized and trigger the display of a barcode, or QR code to create a new deal or combination of deals based on where the scan is taken, from which magazine/newspaper scan is taken, items bought so far etc.

In one embodiment, pictures the user took of a magazine illustration which included a surfboard and a coupon for surfboard lessons is analyzed. The coupon is recognized and the barcode is stored in the device for presentation later. The surfboard is recognized and a request is made to a remote server for surfboard and related product/service coupons. The resulting SKUs are then received, stored and displayed to the user on the device or a connected device.

Redemption Aiding Tools

In one embodiment, a device is programmed to track which coupons presented are recognized and thus can verify the running total to ensure accuracy of the purchase.

For instance, the plurality of coupons presented may represent a certain value saved. In one embodiment one coupon may be worth $0.25 while another $0.75. Upon successful entry of the coupons as verified by a "beep", the total saved should be $1.00. This amount can be displayed on the device after successful entry of the coupons into the scanner. This number should correlate with the receipts and POS display, which often lists the amount saved. The consumer can verify this and upon discrepancy, discuss the issue with the merchant before leaving the store.

In another embodiment, before presentation at the point of sale, a user can see how much savings her coupons will enable. This estimate of savings has many applications. In one embodiment, as the user shops around the store or even before entering the store, she can enter products and/or costs manually, or by scanning barcodes, taking pictures and using image recognition, NFC or other methods enter prices of products. The coupon savings are added to the total to give notice of what she will need to pay.

In another embodiment, the coupon savings may be estimated at different merchants. The consumer can see which of her coupons are sold at various stores and can see if she used the coupons at a given store, how much she would save over other stores.

Here, the coupons can be analyzed by merchants in her physical area. The particular products associated to each coupon can be determined if they are offered/are in stock and for what price. The prices she will pay at each merchant can be displayed to the user. The user will thus, be able to compare which merchant in her area is offering the lower combined price and if it is even in stock.

Micro-wireless devices in the store indicating different sections of the store or different products can be used to help route the consumer through the store in order to find the products associated to the coupons she has clipped. The various sections/products can be displayed on the user device overlaid on a map of the store and/or directions can be given to the consumer. In addition, the relative directions of the products/sections can be displayed when the consumer looks through the device camera. The display may indicate what particular product/section is in a relative direction, what the distance to the destination is, products/sections related to the coupons or her profile etc.

In one embodiment, the action of a consumer presenting the coupon to a scanner and/or the successful input into the scanner may be recorded. This information may be incorporated into a profile associated with that consumer. In a manner similar to the Swote subject matter discussed above, a favorable affinity tag may be associated with the coupon, the coupon's expiry date, manufacturer, the product, the store at which the coupon is redeemed, the price etc.

Combination Embodiments

As discussed above, clipped coupons may be added to a user profile. The combination of coupons a user clips/actually presents at a POS may be analyzed and trigger new discounts in response to the clipped coupons. In addition, this combination in addition with a user's profile may also trigger discounts.

For instance, in one embodiment, a user is presented with a plurality of coupons on a computing device. In response to a user selecting coupon A and B, a discount C is offered as a result of these selections. The discount C may or may not be advertised to users who have not selected coupons A and B.

In another embodiment, a user selects coupon A. The selection is analyzed with the user's profile on a remote or on the local device. Given the user's profile, which may include shopping history, brand sorting information (as discussed in previous patent applications), geolocation information, browsing history etc., a further discount is given. For instance if her profile indicates that coupon A is from a category of goods that the user has not purchased before but, as determined from brand sorting, is statistically likely to have an affinity for, a larger than average discount can be given to incentivize a purchase.

In another embodiment, the user's selection of coupons A and B and the user's profile history is analyzed and used to determine that the user may like another product D. An incentive such as a coupon can be given for product D that may or may not be given or advertised to other users since it is determined that it is statically likely from her profile and/or the combination of coupons A and B that product D is needed/often used or often desired with the goods associated to coupons A and B. This discount could also consider a specific store's inventory. For instance, if a significant excess of product D is in inventory, then a discount or a larger than planned discount could be offered to the user.

In yet another embodiment, the user's profile is analyzed once one or more coupons are clipped. From analysis of the user's profile, a discount of one or more of the clipped coupons or goods not selected by the user may be given to the user. For instance, if a user is determined to be statistically unlikely to be able to afford the good now, but might in the future (e.g., a user who is a medical student), a discount could be given to expose the user to the good in the hope of the user returning to buy the good when she is in a better economic situation.

In another embodiment profiles from a plurality of loyalty accounts can be analyzed with various information such location date on the user's device, browsing history, purchase history, friend's data etc. Agreements between loyalty programs can be used as above to analyze and incentivize purchase of goods based on user's profile and clippings.

In one embodiment, data comprising profile data, purchase history, brand sorting, friend's data can be stored locally on the user's device and may be shared with other devices. In this manner, a user who has a tablet and phone can have access to the same data with either device. This may be accomplished by direct sharing or centralized storage and sharing on a remote device over a network.

The profile/coupon analysis can be done by calculating the vector distances between persona vectors, the coupon vector as discussed in previous patent applications.

Sharing Embodiments

The user's clippings and/or profile information may be shared between user's. This promotes the clippings and incentivizes further purchase by other users. Characteristics of a profile may also be used to help match coupons from a user to another user.

A coupon clipping log may be kept in which clippings are stored and geofencing reminders and/or coupon expiry date reminders will inform a user to use the coupons at the appropriate time/location.

Error Mitigation Embodiments

Reading errors may occur during coupon input. Various methods are available to prevent/mitigate reading errors.

Putting the device substantially flat against the scanner minimizes glare and other interference. To this end, the device can start presenting SKUs to the scanner, once the device detects (e.g., via gyroscope) that it is substantially flat on the scanner. Intervals between beeps can be calculated starting at a given time after the device starts presenting information.

When using NFC, a user can place the back of the device against the reader. The screen facing the user may display the status of what information is being presented if reading is successful, redemption is successful (e.g., the coupon is not expired), keep a running total of money saved etc.

If a coupon is not successfully read by the scanner as determined by a lack of scanner beep, a predetermined time interval etc., the presenting device can skip the coupon and move on to the next coupon. Indication of an unsuccessful read may be done upon a "unsuccessful beep sound", a sequence of the presenting device's flash etc. A status screen may be shown to the consumer/cashier with the coupon that was unsuccessfully presented and a SKU to be manually typed in to the point of sale, a reason why the coupon was not successful (e.g., expired, unreadable, not valid at this location).

In yet another embodiment, a plastic, fabric or other material can be constructed to form a covering over the scanner and the device presenting the information. The covering forms a substantially light-free environment, in which serves to 1) prevent glare from other light sources which prevents reading information off the device's screen; and 2) will serve as an optional trigger to the device. Regarding the second aspect, the device's light meter/camera may detect a lack of any substantial light after the presentation app is started as an additional/optional indication to start presentation of the coupons. For instance, the user may request the app start presenting coupons in which a screen with relatively low light emission such as a black screen with font colors that emit relatively low light are displayed saying "please place on scanner to redeem your X number of coupons". The cashier may place the covering over the device and scanner. The device detects a substantial drop in light and begins presentation of the coupons. The cash register may record the number of coupons and when the X number of beeps or X number of coupons are redeemed on the cash register window, the covering is removed. Alternately, the phone may ring when the redemption is over.

Other Embodiments

Coupon clipping can be a reliable reflection about the demographics of a consumer. As discussed, in the above previous patent applications, consumer selecting information about themselves such as would buy, would be interested in a coupon about, is interested in a discount can be valuable. The brands associated with their interest can be analyzed as discussed in said patent applications such as summing tags associated to brands and forming a profile/persona vector.

When a consumer clips coupons, it is reasonable to infer that she is interested to a relatively high level of degree in the coupons and perhaps the details in the coupons. Thus, a profile may be supplemented or even constructed from coupon clippings. Specifically, as the consumer clips coupons, the product and associated brand can be analyzed such as via a taxonomy and tags associated to them. Alternatively, tags may be assigned directly by the entity that offered by the coupons.

"Brands" as defined in the incorporated patent applications as well as coupons, ads, products etc. may be matched to said persona vector by calculating the distance or other methods. Said brands can be presented to the user as suggestions to purchase etc., or can be presented to the user for brand sorting as discussed in the incorporated patent applications.

In the embodiment of coupons, several pieces of information on the coupon can be integrated into the profile and/or into an existing loyalty card account. For instance, the expiry date, percentage discount, amount of discount, redemption locations, other redemption conditions such as "must be purchased with X", languages the coupon is offered in (e.g., English & Spanish), retailer offering the coupon, specific product and associated manufacturer, combination of coupons redeemed, specific location/date/time the coupons was redeemed at etc.

These characteristics can be added to her profile and further brands, coupons, user specific discounts etc., can be offered to the consumer.

Integration with Loyalty Cards, Scanner Specific Details and Activation of Functionality Integration of platform specific equipment specifications such as specific input/output sounds and other properties/requirements for compatibility by a retailer may be integrated e.g., Bad "beeps" maybe platform specific.

In, one embodiment, the device itself can be triggered to activate the application or invoke functionality as the operating system level through a variety of methods. For instance, location of the device in certain GPS coordinates or the detection of certain wireless signals such as from a retailers wireless network may invoke functionality. Input of a scanner signal as detected from a camera, NFC, link from a text, email or other signal such may trigger activation illustrated in operations #1-#3 automatically.

In another embodiment, at the end of coupon assembly, a barcode or RQ code can be created to convey information about how, from where, the coupon originator and other information about how the coupons where collected. This barcode may be read at the point of sale in addition to presented coupons/loyalty card to give extra information to the originator of the coupon. The information can include information for routing/transmission to the originator or manufacturer.

In another embodiment, an app can be configured to detect by GPS which particular store the consumer's device is located at and upon checkout, present that store's particular loyalty card barcode. This is particularly helpful if a coupon is valid at a plurality of stores each with different loyalty cards.

Common Material Background for Swote and Coupon Presenter

Technical Problems Solved

As discussed in this document, the discussed subject matter solves several technical problems. Specifically solved is the input and processing of user input information such as user affinity to efficiently determine user characteristics from content as well as novel input of commands such as copy/paste on a small mobile device screen among other computing devices. The related processing by a client/server is also made more efficient due to the enhanced gathering of information. Also solved is the problem of the user being overwhelmed with irrelevant advertising. The advertar solution as discussed herein, creates efficiencies as the user can more easily filter information and therefore be fed relevant ads.

Also solved is the problem of the need for rapid presentation of information such as barcodes at barcode scanners. Specifically solved is the input with a minimum of user interaction of a plurality of information to scanners quickly and efficiently.

Description of Computer Hardware

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

Figure 12:
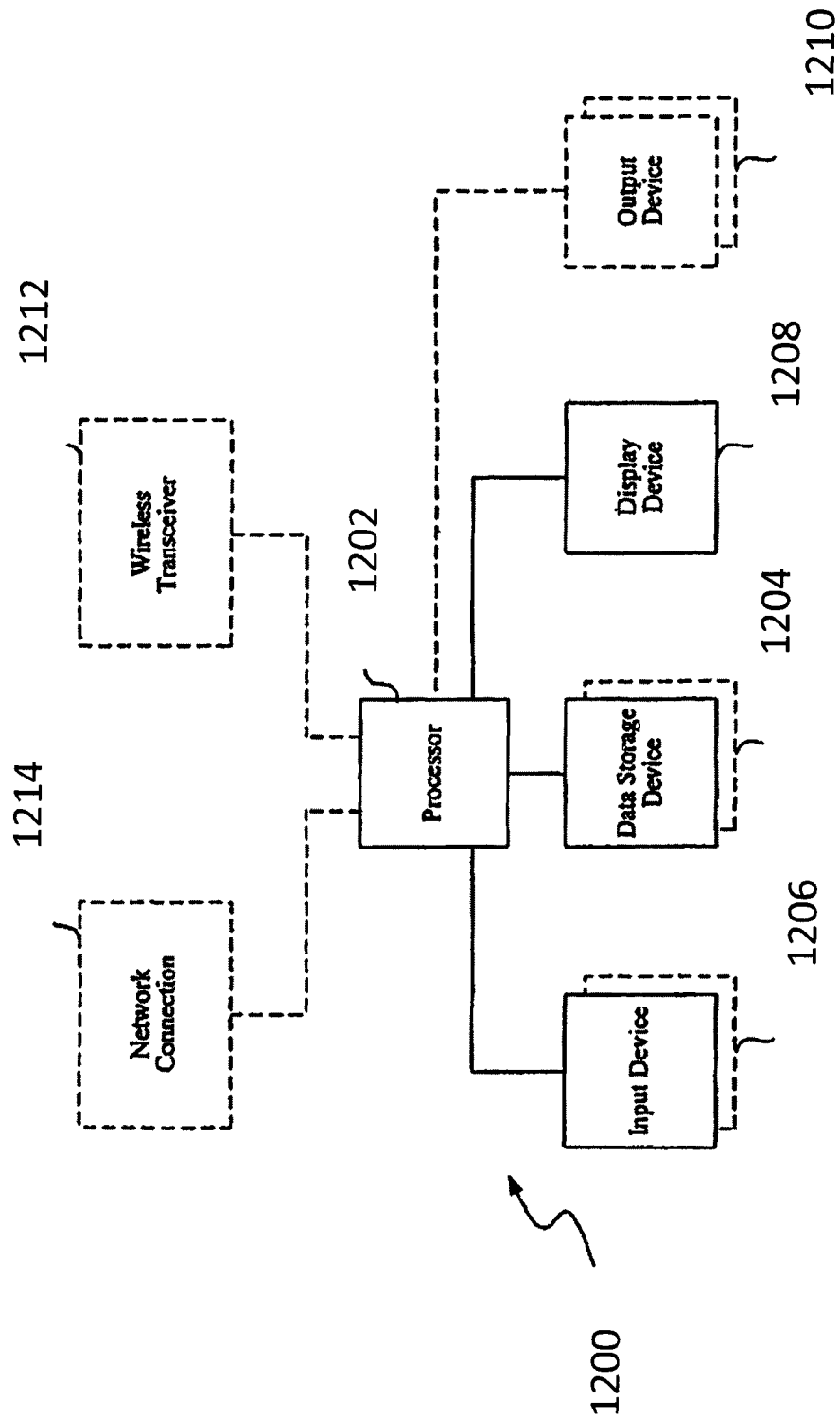
FIG. 12 illustrates a block diagram of a user's computing device in accordance with an embodiment of the disclosed technology.

A non-transitory, computer-readable storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium also can be, or can be included in, one or more separate physical components or media (e.g., multiple CDs, disks, or other storage devices). The operations described in this specification can be implemented as operations performed by a data processing device using data stored on one or more computer-readable storage devices or received from other sources. A representative data processing device is shown in FIG. 12.

The data processing device includes "processor electronics" that encompasses all kinds of apparatus, devices, and machines for processing data, including by way of example a programmable microprocessor 1202, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices 1204 for storing data, e.g., flash memory, magnetic disks, magneto-optical disks, or optical disks. However, a computer need not have such devices. Moreover, a computing device can be embedded in another device, e.g., a mobile telephone ("smart phone"), a personal digital assistant (PDA), a mobile audio or video player, a handheld or fixed game console (e.g. Xbox 360), a Global Positioning System (GPS) receiver, or a portable storage device (e.g., a universal serial bus (USB) flash drive), to name just a few. Devices suitable for storing computer program instructions and data include all forms of volatile or non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device 1208, e.g., an LCD (liquid crystal display), LED (light emitting diode), or OLED (organic light emitting diode) monitor, for displaying information to the user and an input device 1206 such as a keyboard and a pointing device, e.g., a mouse or a trackball, track pad etc. camera (e.g., optical, 3D and/or IR), proximity detector, by which the user can provide input to the computer. In some implementations, a touch screen can be used to display information and to receive input from a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser. The data processing apparatus 1200 may also include a wireless transceiver 1212 such a cellular radio, WiFi or WiMax transceiver, Bluetooth transceiver and a network connection 1214 etc. The data processing device may also include an output device such as a printer 1210, camera flash, LED, haptic feedback, speaker, vibrator, NFC (Near Field Communication). In addition, the device may include location sensing devices (GPS etc.), as well as clocks and other circuitry (not shown).

Figure 13:
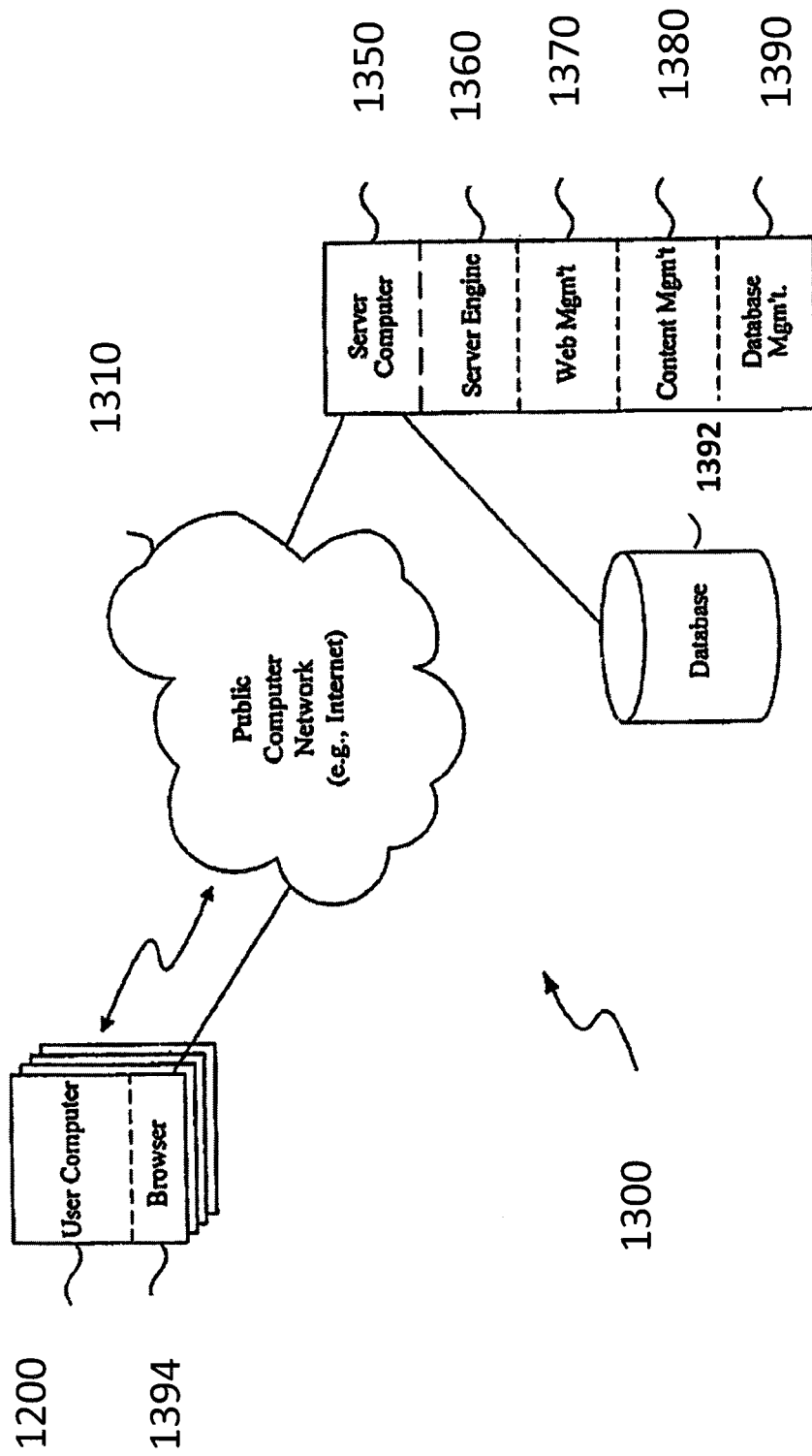
FIG. 13 illustrates one embodiment of a networked computing system used in implementing the disclosed technology.

As shown in FIG. 13, embodiments of the subject matter described in this specification can be implemented in a computing system 1300 that includes a back-end component, e.g., as a data server, or that includes a middleware component, e.g., an application server, or that includes a front-end component, e.g., a client computer 1200 having a graphical user interface or a Web browser 1394 through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a wired or wireless local area network ("LAN") and a wide area network ("WAN"), an inter-network 1310 (e.g., the Internet), and peer-to-peer networks (e.g., ad hoc peer-to-peer networks).

The computing system can include any number of clients and servers. A client and server are generally remote from each other and typically interact through a communication network. The relationship of client and server arises by virtue of computer programs running on the respective computers and having a client-server relationship to each other. In some embodiments, a server 1350 transmits data (e.g., an HTML page) to a client device (e.g., for purposes of displaying data to and receiving user input from a user interacting with the client device). Data generated at the client device (e.g., a result of the user interaction) can be received from the client device at the server. In the embodiment shown in FIG. 13, the server computer 1350 operates server engine software 1360 and web management software 1370 to receive data from and send data to remote clients. In addition, the server computer operates a database 1392 to store persona information for users who wish to receive ads as described above. Content management software 1380 and database management software 1390 allow the server computer to store and retrieve persona information from the database and to search the database for personas that meet advertiser's criteria for a target audience.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

APPENDIX A

Appendix A serves to briefly discuss concepts disclosed in the incorporated patent applications including: brand sorting interfaces, the relationship between brand sorting and marketing data, creating/supplementing profiles (advertars) from brand sorting and marketing data, taxonomies among some concepts.

Personas/Profiles/Advertars

In one embodiment, the demographic characteristics attributed to a persona are determined based on responses to the user's indicated opinions such as likes or dislikes of a number of brands. As used herein, characteristics may include the demographic characteristics of a population such as (gender, age, location, marital status etc.) as well as properties, characteristics or traits relating to single individual users such as a user's individual interests.

Personas can be created in any number of ways. For example, a user can complete a questionnaire by responding to questions regarding the user's gender, age, income level, residence, political affiliation, musical tastes, likes or dislikes (e.g., interest keywords), pieces of content (e.g., pictures) she likes/dislikes and so forth. Such a questionnaire can be provided on a software application (e.g. an app) that runs on a user's computing device or on a designated web site. The answers provided to the questionnaire are converted to one or more likely demographic characteristics that advertisers can use when choosing a target audience for their ads. Characteristics such as demographic characteristics allow the advertisers to search the personas to find those personas of users that meet the criteria of the advertiser's target audience. Ads can then be sent to the addresses or identifiers associated with each of the personas.

In another embodiment, personas are defined in a way that infers the user's demographics based on the user's opinions of (e.g., how the user likes or dislikes) various brands which may supplement or even replace the above techniques of gathering data.

Brand Sorting/Marketing Data/Brand-Ad Matching Calculations/Audience Creation

Operation 1 in FIG. 14 illustrates a method by which a user can indicate their opinion of a brand such as if they like a brand either more or less or feel neutral about the brand. As used herein, an opinion may encompass input from any user interaction with or relating to the brand. Such examples include if a user likes/dislikes, purchase/would not purchase, want/do not want as well as if a user is "following" a brand such as following a brand via Twitter™. In the embodiment shown, the interface screen is divided into three areas (which may the interface on a mobile device touch screen, or other computing device). A neutral area (middle row) represents a neutral feeling about the brand (or unfamiliarity with the brand). Top row is an area where the user places icons representing the brands they like more/shop at while bottom row is an area into which the user places the icons that represent the brands they like less or does not shop at.

In one implementation, each persona is associated with one or more tags representing different characteristics such as different demographic characteristics. The association may be determined via the brand sorting during persona creation. A tag may store or be associated with a value that represents the likelihood (e.g., a probability distribution) that the demographic characteristic represented by the tag is applicable to a user. For instance, the value of the tag may reflect a probability that the user is male while another tag represents the likelihood that the user lives in New York.

Based on the user's indication of their opinion of the brands, such as if each brand is liked or disliked, the tag values can be combined into a composite value that reflects that likelihood that the user has a particular demographic characteristic.

In one embodiment, the composite demographic information is created from the group of brands that are sorted by the user based on her opinions of the brands. In the example shown in FIG. 14, a user indicates that they shop for (e.g. like) brands 1, 2 and 4. The user has indicated that they don't shop for (e.g. don't like) brand 6 and are neutral towards (e.g. don't like or dislike or are unfamiliar with) brands 3, 5, 7, and 8. In one embodiment, the tag values representing the likelihood that a user has a particular demographic characteristic are combined depending on if the brand is liked or disliked. In other embodiments, buy/not buy, would buy/would not buy, use or would use, do not or would not use as well as other opinions or impressions can be presented alone or in combination.

In one embodiment of the disclosed technology, the tags for the brands represent the same demographic characteristic. For example, Tag 1 for all the brands may represent the likelihood that the user is a male between ages 25-40, while Tag 2 may represent the likelihood that the user is a male between ages 40-55. Tag 3 may represent the likelihood that the user is a woman between ages 18-22 etc. Each tag has or is associated with a value representing the likelihood of a user having a defined demographic characteristic. These values for the tags are typically determined from information gathered from consumers who volunteer information about themselves and what brands they like, purchase etc. Such information is typically gathered from marketing data from consumer surveys or a variety of other data sources. The details of associating consumer demographic information with particular brands are considered to be well known to those skilled in marketing. In other embodiments, users may assign a value to a brand by inputting the value itself into the computing device, assigning a relative value to each brand and or tag (brand X given a higher preference to brand Y by giving brand X a location assignment a screen above or to the right of brand Y) etc.

In one embodiment, the composite demographic characteristics for a persona are created by arithmetically combining the values of the tags for the liked and disliked brands. In the example shown, Brands 1, 2 and 4 are liked so their tag values are summed while Brand 6 is disliked so its tag values are subtracted. When combined as illustrated, Tag 2 has a summed value of 4.0 (1.5 plus 1.5 minus (−1.0)). A value of 4.0 for a tag may represent a strong likelihood that a user has the demographic characteristic defined by the tag. On the other hand, a tag with a combined value of −2.5 may provide an indication that the user probably does not have the demographic characteristic associated with the tag and an inference can then be made. For example, if a composite gender tag value suggests the user is likely not a male, an inference can be made that the user is a likely female. A composite of the values of the brand tags across the brands (e.g., the sum of statistical probabilities of tag A across brands X to Y as seen in FIG. 7) may also be represented by a vector that is associated with the persona. Each brand tag value in FIG. 7 may be a dimension of the vector.

In one embodiment, based upon the composite demographic characteristics, the corresponding user or persona may be placed into pre-computed demographic segments. Such pre-computed segments are typically determined from marketing survey data. Once the user is assigned to the segment, additional associated characteristics of the pre-computed segment may be associated to the user. In addition, ads that have been specifically designed to target the pre-computed segment may be delivered to the user.

In one embodiment, an ad/offer/content that a persona may be interested in receiving may be matched with the persona based on said persona vector. Typically an ad comes with tags such as coffee, sale, spa, dancing lessons etc. Here, an ad/offer's tag values may be assigned based on marketing data taken from consumer surveys such as a probability distribution that a certain demographic (age, sex, income etc.) would likely desire to receive ads with a given ad tag. The composite of ad tag values represent a vector for the ad. Each of these offer tag values may therefore be considered as an ad vector dimension. In one embodiment, tags related to the ad tags may be assigned along with their associated values to aid in ad-persona matching.

Once a persona is defined, a plurality of ads can be ordered for presentation to the user according to likely persona affinity. By calculating the distance between the persona vector and the ad vector, such as their distances in N tag space, ads can be ranked in order of likely persona desire. The result of this distance calculation may be a ranked list of ads in order of affinity (i.e. the distance between the vectors) for a particular persona vector. In this manner, instead of filtering out ads, a relative ranking of ads is produced. Alternately, other distances between the ad and persona vectors (or any of their components) can be calculated to produce a ranking. Various other methods of ad filtering and ad sorting to match the appropriate ads to the persona may also be used. In some embodiments, location, past purchases, sale times/items, membership in customer loyalty programs, percentage off and other factors may be used to aid in ad ordering/selection. In one embodiment, the calculated affinity for a particular ad is displayed to the user as stars (e.g., an ad with a highly calculated affinity is four our of four stars etc.). In another embodiment, the ordering/filtering may consider the ratio of the geographic distance to an offer and the percentage off. For instance, if an ad is only 10% off and the distance is several hundred miles from the user, this ad would have a lower ordering than an ad that is 90% off and one mile away from the user. Here, the distance and percentage off etc., may be displayed to the user as well. In yet another embodiment, the persona may keep track of ads that resulted in a purchase by the consumer. After a purchase, the user will not be shown the ad on the persona that made a purchase or on all her personas.

Optionally, the dimensions on the persona vector and/or the ad vector can be normalized by multiplying the dimension by a scalar between for instance, zero and one, to prevent particularly strong tag dimensions from skewing the results.

In some embodiments, a user may not be limited to the binary choice of only indicating that they like or dislike a brand. The user may be presented with controls to indicate that they strongly like or dislike a brand based on a number of discrete levels or using a sliding scale etc.

Taxonomies

In one embodiment, once a user has created or adopted one or more personas, the personas are registered with a server computer that maps a persona to one or more addresses or other identifiers to which ads should be delivered. As discussed above, the address may be an e-mail address, IP address, device id., web site or another logical address that can be used to direct ads to the user.

A selected persona defines one or more demographic characteristics (such as interests like That food) that may be of interest to advertisers in selecting a target audience to receive their ads.

A taxonomy may also expand the user's interest tags. For example, the user has rated That Restaurants a +6. As such, the user would probably be interested in prepared foods in general as well as That foods and perhaps even travel to Thailand (this may be based on marketing data or other tools). These relationships can be from user survey information. The new tags and associated values can be assimilated into the persona. This expansion of tags provides the user the opportunity to see additional topics, brands, times, locations and other related information. In addition, a user may give feedback on the tag's desirability and associated value.

Ads may be displayed to users on the same device on which brand sorting occurred or on multiple different devices. The ads may be shown on these devices within a specified amount of time or upon an event trigger such as proximity to a merchant's store, the start of a sale, another user expressing interest in the ad etc.

Weighting

In one embodiment, the demographic information associated with a persona is refined depending on how the user reacts to ads delivered to the persona or previous brand sortings. For example, if the user indicates that they do not like an ad, one or more tag values associated with the persona may be adjusted. In this way, a persona's determined demographic characteristics can be continually improved or updated. In one embodiment, ads can be shown as icons and displayed and assigned affinity/voted on in a manner similar to how brands are sorted as illustrated in FIG. 6. Answers such as "like the ad" "neutral" and "dislike the ad", a picture of a "thumbs up" and "thumbs down" may be displayed on various screen areas so the user may know where to drag the icons to and thereby assign affinity to the ad.

In one embodiment, the feedback from user assigned ad affinity may make very granular adjustments to a persona. In one embodiment, a simple vote on an ad may modify a plurality of aspects of a persona by considering the specific tag, subcategory tag and associated weights among other things. If an ad was assigned a negative affinity, the tag and associated values may play a lessor role in assigning ads in the future.

System for Delivering Ads to Personas

Figure 16:
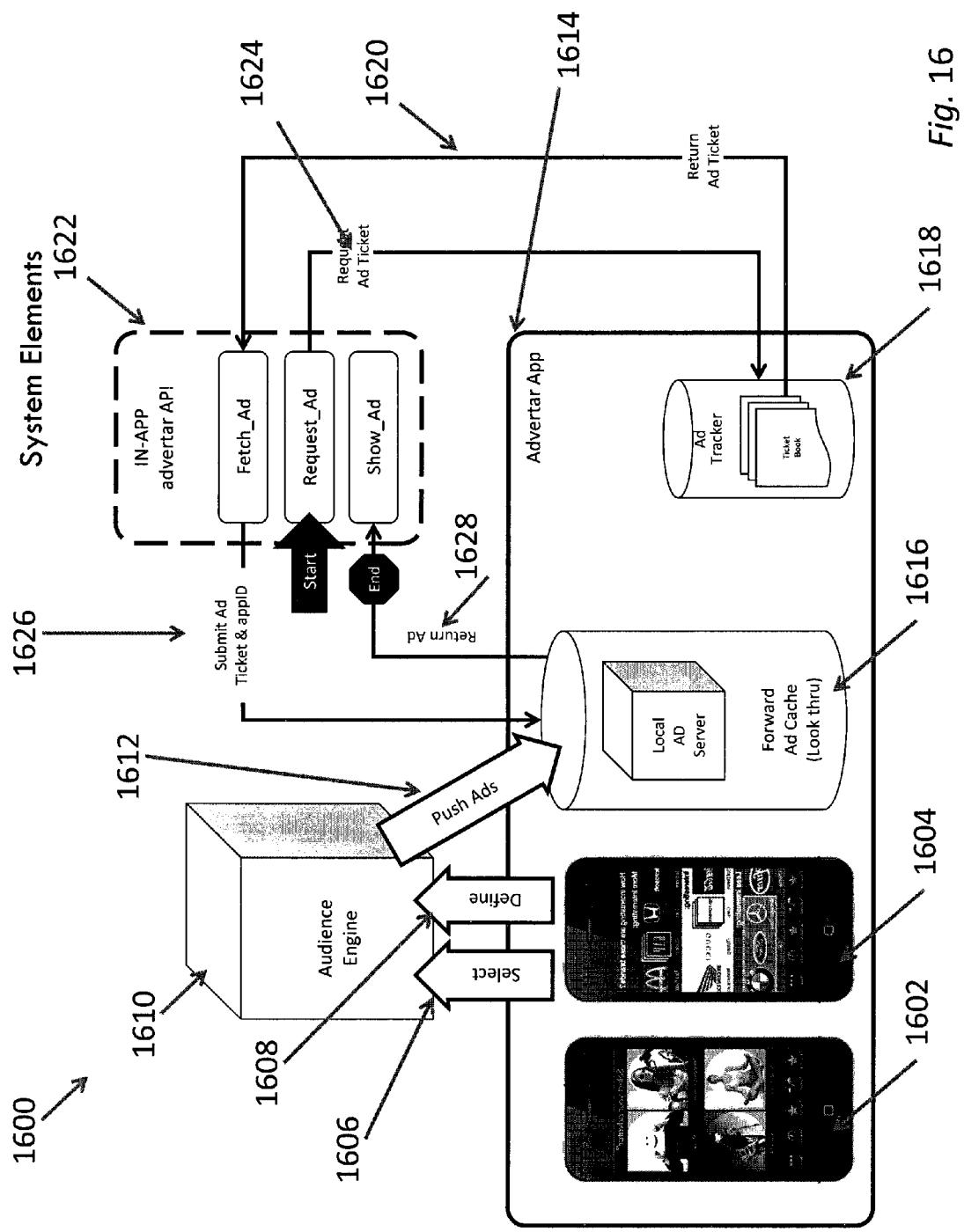

FIG. 16 illustrates an exemplary system 1600 for creating personas and ad serving to a persona on a computing device. At 1602 a mobile device is shown. On the screen are images representing four personas tied to a single account. A user may optionally register the account under any identifier including an email address. In one embodiment, the email address is one way hashed and discarded after the hash. The hash is optionally stored by the audience engine and serves as an identifier. This prevents the storage of user's identifying information on non-user devices and enables the user to have an identifier in case she forgets her password etc. In another embodiment, only one persona is created and no identifier is asked from the user. Instead, a software install ID or other identifier is used to identify the persona.

A persona may be created by optionally choosing a name for the persona, associated interests/keywords (e.g. to help focus ad searches), social media accounts to tie the persona to and active locations/times the persona should be active among other parameters. Then, a brand sorting screen may be displayed at 1604. Upon sorting a number of brands, at 1606 and 1608 the brands that define the persona are transmitted to an audience engine 1610, which may be on a remote server.

The persona's demographic characteristics are matched with ads, offers, coupons, services, products, content recommendations or other similar things. Typically, the audience engine 1610 is in communication with a third party ad server and/or ad bidding system (not shown). The ads may be pre-downloaded to the audience engine 1610 and analyzed. Analysis may be performed by assigning tags and associating statistical probabilities that particular demographics would be interested in the ads or assigning probabilities to existing tags or other data related to the ad. The ads are then optionally ordered in relevance to the characteristics of a particular persona's vector as previously discussed. Here, in response to the persona creation, a plurality of ads are pushed to the mobile device at 1612 from the audience engine 1610. The ads are pushed into a local ad server 1616 on the user's computing device. Here the local ad server is within the application 1214 that created the persona. Within the application 1614, is an ad tracker 1618 with a ticket book. Each ticket may be used to request an ad from an in-application persona API 1622. In one embodiment, a ticket may contain information to display an ad to one or more personas and/or to different devices or applications associated with the persona.

The request for an ad may occur upon a user or a software request or on the occurrence of an event such as an arrival of the device at a physical location, keyword in communication, predetermined by an advertiser, event on a calendar, time of a TV show, a triggering event such as visiting a website, date of a product sale etc. API 1622 may start the ad request at 1624, which is transmitted to ad tracker 1618. Ad tracker 1618 returns a return ad ticket at 1620 to API 1622. API 1622 then submits the ad ticket and application ID at 1626 to the local ad server 1616. The local ad server then displays the ad on the device or other connected devices at 1628. In one embodiment, the application ID at 1626 can be directed toward other applications on a plurality of connected devices in order for an ad to be shown on other devices. Optionally, upon display of the ad, at 1626 a request can be made to a connected device to display other content such as a website related to the displayed ad or the ad itself on other devices.

APPENDIX B

```
Sample Code for A Swote Tool:
$('body').mousemove(function(e) {
  if( keyFlag &&
    false == mouseFlag) {
    var offset, nearestEl, el = e.target;
    //
    // don't try to highlight the highlighter. Get the element
    // underneath the hightlighter
    if (el.className === 'outer') {
      box.hide( );
      el = document.elementFromPoint(e.clientX, e.clientY);
    }
    //
    // get the coordinates of the element under the mouse and
    // use this to find the nearest img or anchor
    offset = $(el).offset( );
    nearestEl = $.nearest({
      x: offset.left,
      y: offset.top
    }, 'img, a')[0];
    //
    // make common the same as nearest for the moment. We might
    // fix it up in a sec. Common is going to be the lowest
    // common ancestor of the hovered element and the nearest img/a
    common = nearestEl;
    //
    // if the element
    // we are hovering over is different than the nearst image
    // or anchor then try to find the lowest common ancestor.
    // BUT, don't do any of this if the element we are
    // hovering over is the BODY tag. BODY doesn't have a parent
    if ($(el).get(0).tagName != 'BODY' && el != nearestEl) {
      common = commonAncestor(el, nearestEl);
      //
      // this can end up undefined
      // if it does, just use the nearest
      // img or anchor as our selection
      if (typeof common == 'undefined') common = nearestEl;
    }
    //
    // make the highlight box the size of the hovered element
    // and put it in the correct spot;
    offset = $(common).offset( );
    box.css({
      'width': $(common).outerWidth( ) – 1,
      'height': $(common).outerHeight( ) – 1,
      'left': offset.left,
      'top': offset.top
    });
    //
    // it's in the right spot, so show it
    box.show( );
  }
});
```

We claim:

1. A portable computing device comprising:
   a display;
   a detection device;
   a transmission device;
   memory for storing instructions that are executable by processor electronics;
   processor electronics configured to execute the instructions in order to:
   detect a first signal from a reader in response to the computing device entering a specific geolocation;
   in response to detection of the first signal, recall content from the memory and display the content on the display as well as transmit a reference to an identity of the content to the reader, wherein the reference to the identity of the content is configured to be added to a user profile;
   detect a second signal from the reader produced when the reader detects the content reference transmission;
   recall other content from the memory for display and transmit a reference to an identity of the other content upon detection of the second signal from the reader; and
   associate the computing device with the user profile, wherein the user profile is comprised of at least;
   1) a user characteristic; and
   2) a statistical probability associated with said user characteristic, said user characteristic and statistical probability based at least upon a user content affinity input and a reference to an identity of content transmitted from the computing device, wherein the user characteristic and statistical probability are configurable as components in an interest graph in which the user characteristic is represented as an interest graph node and the statistical probability is represented as an interest graph link connecting the interest graph node to another interest graph node.

2. The device of claim 1, wherein the processor electronics are further configured to execute the instructions in order to: in response to the detection device receiving an error indication transmitted by the reader in response to receiving a reference to an identity of content, display an error indication on the display.

3. The device of claim 1, wherein the processor electronics are further configured to execute instructions in order to: activate the transmitter and transmit one or more of the location, date, time or user ID when the first signal is received by the system device.

4. The device of claim 1, wherein the user content affinity input is a brand affinity input.

5. The device of claim 1, wherein the user content affinity input comprises a negative user content affinity input.

6. A non-transitory computer readable media having instructions stored thereon that are executable by a portable computing device to:
   display one or more items of content to a user;
   detect a selection by the user of at least one item of content displayed;
   in response to the detection of the selected content, determining if the selected content includes any related information;
   configuring a reference to an identity of the selected content and any related information to be used to update a profile of likely characteristics of the user based on the selected content and the information related to the selected content, wherein the profile is comprised of a likely user characteristic and an associated statistical probability, said likely user characteristic and statistical probability based at least upon a plurality of user content selection inputs, wherein the likely user characteristic and statistical probability are configurable as components in an interest graph in which the likely user characteristic is represented as an interest graph node and the statistical probability is represented as an interest graph link connecting the interest graph node to another interest graph node; and update the profile with the reference to an identity of the selected content and any related information.

7. The non-transitory computer readable media of claim 6, further comprising instructions that determine a link associated with the selected content.

8. The non-transitory computer readable media of claim 7, further comprising instructions that transmit the link to a remote computer system.

9. The non-transitory computer readable media of claim 6, further comprising instructions that assign a tag to the selected content wherein the tag is a record of a gesture.

10. The non-transitory computer readable media of claim 6, further comprising instructions that assign a tag to the selected content wherein the tag is a record of a user's Indicated like or dislike for the selected content.

11. The non-transitory computer readable media of claim 10, further comprising instructions that transmit the tag to a remote computer.

12. The non-transitory computer readable media of claim 6, further comprising instructions to indicate that one or more items of content on the display are selectable with a user gesture.

13. A non-transitory computer readable media having instructions stored thereon that are executable by a portable computing device to:

tag an item of content with one or more likely characteristics that are attributed to persons that react to the item either favorably or unfavorably;

display the content for a user;

detect a gesture performed by the user directed towards the content; and update a profile that indicates one or more likely characteristics of the user with the characteristics represented by the tag and an associated statistical probability, said one or more likely characteristics and associated statistical probability based on the detected gesture directed towards the content, wherein the one or more likely characteristics and statistical probability are configurable as components in an interest graph in which a likely characteristic is represented as an interest graph node and a statistical probability is represented as an interest graph link connecting the interest graph node to another interest graph node.

14. The non-transitory computer readable media of claim 13, further comprising instructions that cause the portable computing device to detect the gesture directed towards the content by:

detecting when the user touches the content on a display screen; and detecting when the user moves a touch point on the display screen in a predefined direction over the content.

15. The non-transitory computer readable media of claim 13, further comprising instructions that cause the portable computing device to display a representation of whether the processor electronics recorded a favorable or unfavorable impression of the content after the user has finished the gesture.

16. The non-transitory computer readable media of claim 13, further comprising instructions that cause the portable computing device to display a menu over the content that indicates what command will be interpreted by the processor electronics depending on an angular direction in which the gesture is performed.

17. The non-transitory computer readable media of claim 13, further comprising instructions that cause the portable computing device to assign the tag to the content based at least upon a URL or URI of a website associated with the content.

18. The non-transitory computer readable media of claim 13, further comprising instructions that cause the portable computing device to assign the tag to the content based at least upon other content presented with the content.

19. The non-transitory computer readable media of claim 13, further comprising instructions that cause the portable computing device to transmit a record of the gesture detected to another computing device.

20. The non-transitory computer readable media of claim 13, further comprising instructions that cause the portable computing device to recommend content to a user based at least on the updated characteristics associated with the user performing the gesture.

* * * * *